(12) United States Patent
Masuda

(10) Patent No.: US 9,994,394 B2
(45) Date of Patent: Jun. 12, 2018

(54) SIDE ARM TRANSFER DEVICE

(71) Applicant: MURATA MACHINERY, LTD., Kyoto-shi, Kyoto (JP)

(72) Inventor: Junichi Masuda, Inuyama (JP)

(73) Assignee: MURATA MACHINERY, LTD., Kyoto (JP)

(*) Notice: Subject to any disclaimer, the term of this patent is extended or adjusted under 35 U.S.C. 154(b) by 265 days.

(21) Appl. No.: 14/955,120

(22) Filed: Dec. 1, 2015

(65) Prior Publication Data
US 2016/0167879 A1    Jun. 16, 2016

(30) Foreign Application Priority Data

Dec. 12, 2014 (JP) .................................. 2014-252082

(51) Int. Cl.
*B65G 1/04* (2006.01)

(52) U.S. Cl.
CPC ......... *B65G 1/0421* (2013.01); *B65G 1/0435* (2013.01)

(58) Field of Classification Search
CPC ............................ B65G 1/0421; B65G 1/0435
USPC ........................................................ 414/275
See application file for complete search history.

(56) References Cited

U.S. PATENT DOCUMENTS

| | | | | |
|---|---|---|---|---|
| 6,923,612 B2* | 8/2005 | Hansl | .................... | B65G 1/0435 414/277 |
| 8,790,061 B2* | 7/2014 | Yamashita | ............. | B65G 1/0435 414/280 |
| 8,827,620 B2* | 9/2014 | Toguri | ................. | B65G 1/0421 414/281 |
| 8,956,099 B2* | 2/2015 | Olszak | ...................... | B66F 9/07 414/277 |
| 9,056,719 B2* | 6/2015 | Tanahashi | ............. | B65G 1/0421 |
| 9,134,734 B2* | 9/2015 | Lipkowski | ............. | G05D 1/024 |
| 9,221,606 B2* | 12/2015 | Yoshinaga | ............. | A62C 3/002 |
| 9,365,347 B2* | 6/2016 | Nakamura | ........... | B65G 1/0407 |
| 9,375,846 B2* | 6/2016 | Okamoto | ................ | B25J 11/005 |
| 9,598,236 B2* | 3/2017 | Nakamura | ........... | B65G 1/0421 |
| 9,701,471 B2* | 7/2017 | Yamada | ................ | B65G 1/0407 |
| 2006/0245862 A1* | 11/2006 | Hansl | .................... | B65G 1/0435 414/281 |
| 2013/0030685 A1* | 1/2013 | Goetting | ............... | G01S 17/936 701/301 |

(Continued)

FOREIGN PATENT DOCUMENTS

| | | |
|---|---|---|
| JP | 2008-247558 A | 10/2008 |
| WO | 2014/034173 A1 | 3/2014 |

*Primary Examiner* — Kaitlin S Joerger
(74) *Attorney, Agent, or Firm* — Keating & Bennett, LLP

(57) ABSTRACT

A side arm transfer device that is more easily assembled includes a right-side arm, a central arm, a left-side arm, a lifting table, laser sensors, a turning mechanism, and a transfer controller. The laser sensors are provided on the lifting table and detect presence or absence of an object on an irradiation line of laser light. The turning mechanism horizontally turns the laser sensors. The transfer controller horizontally turns the laser sensors and detects the presence or absence of an object in each of a plurality of detected portions on a load storage shelf, to determine the presence or absence of an object in each of mounting locations and the presence or absence of an object in a location, on the side of each of the mounting locations, to which each of the right-side arm, the central arm, and the left-side arm is to be extended.

6 Claims, 18 Drawing Sheets

(56) References Cited

U.S. PATENT DOCUMENTS

| | | | | |
|---|---|---|---|---|
| 2014/0377050 A1* | 12/2014 | Hellenbrand | B65G 1/0421 | 414/807 |
| 2015/0203294 A1 | 7/2015 | Yamada | | |
| 2015/0259141 A1* | 9/2015 | Yamada | B65G 1/0407 | 414/267 |
| 2015/0321845 A1* | 11/2015 | Nakamura | B65G 1/0421 | 414/273 |
| 2016/0122161 A1* | 5/2016 | Mannari | B66C 1/42 | 700/275 |
| 2017/0153641 A1* | 6/2017 | Serizawa | G01C 3/08 | |

\* cited by examiner

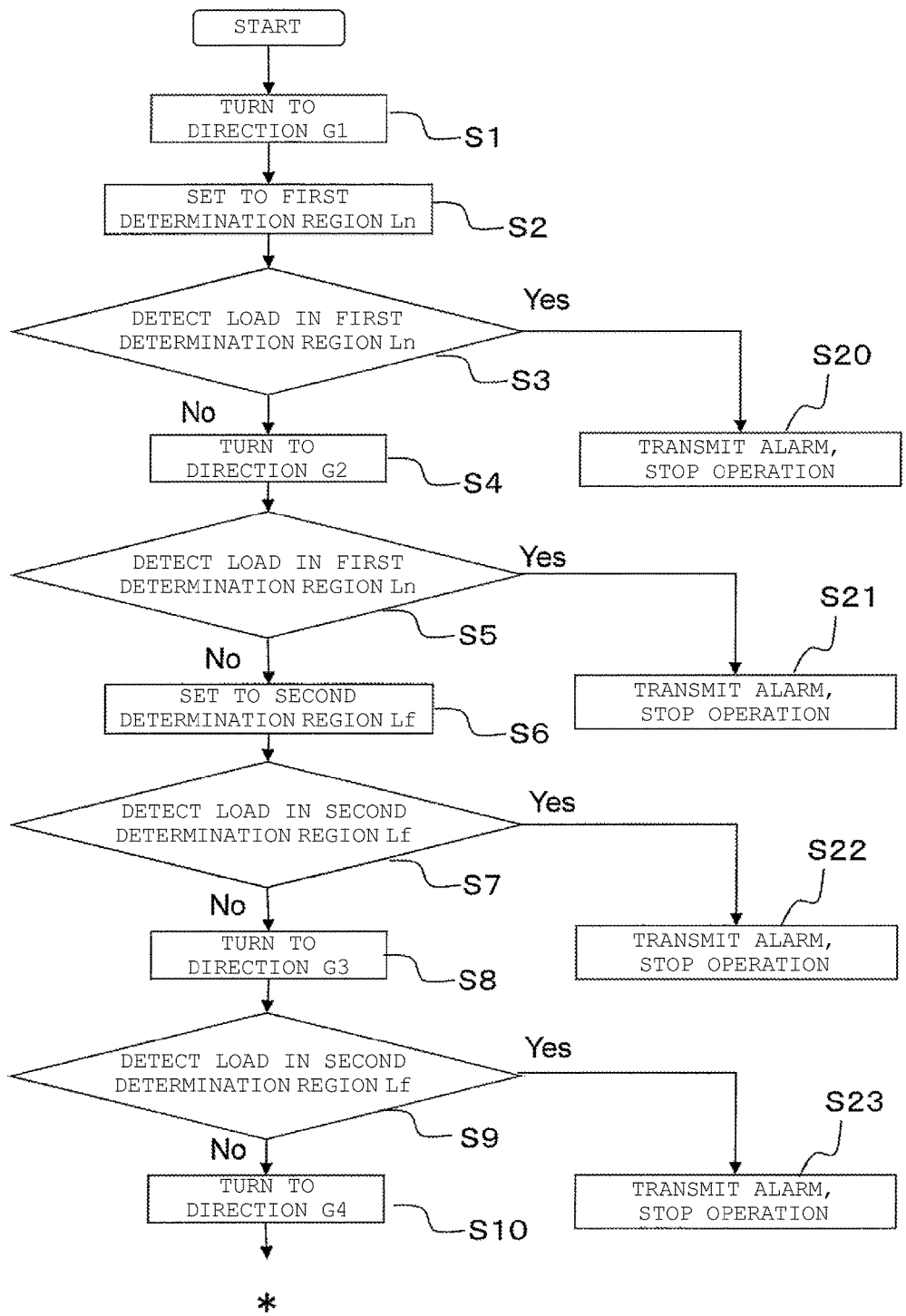

SIDE ARM TRANSFER DEVICE

BACKGROUND OF THE INVENTION

1. Field of the Invention

The present invention relates to a side arm transfer device that transfers a load.

2. Description of the Related Art

An automated warehouse is provided with a stacker crane for moving a load onto and out of a shelf installed inside the automated warehouse. The stacker crane includes a travelling carriage, a lifting table liftably mounted on a mast provided on the travelling carriage, and a side arm transfer device provided on the lifting table (e.g., WO 2014/034173 A1).

The side arm transfer device is provided with a pair of arms, and hooks are provided on each of the arms. End portions of a load are hooked by the hooks and the arms are extended or retracted to push or pull the load, to transfer the load.

In such a side arm transfer device, when a load is to be transferred to the shelf, whether or not there is a load in a intended transfer location is previously detected (first-in item detection) and whether or not there is a space that each arm can enter is also previously detected (space detection).

However, in order to perform the first-in item detection and the space detection described above, separate photoelectric sensors are required to be used for the respective detection.

Thus, at the time of assembling the device, a plurality of photoelectric sensors are required to be assembled to the side arm transfer device, thus causing wiring arrangement, optical axis alignment, and the like, to take time, and the cost to increase. In particular, in the case of a side arm transfer device which is configured to be capable of simultaneously moving loads to two mounting locations on the front side and the rear side of the shelf, photoelectric sensors have been respectively required for performing the first-in item detection on the front side, the first-in item detection on the rear side, the space detection on the front-side arm, and the space detection on the rear-side arm. This has caused the number of photoelectric sensors to further increase and the assembly to take longer time.

SUMMARY OF THE INVENTION

Considering the problem of the conventional side arm transfer device, preferred embodiments of the present invention provide a side arm transfer device which is more easily assembled.

In the following, a plurality of aspects of various preferred embodiments of the present invention will be described. These aspects can be arbitrarily combined as necessary or desired.

A side arm transfer device according to one aspect of various preferred embodiments of the present invention is a side arm transfer device which extends and retracts an arm to and from a side of a load to be transferred, the device including a mounting table, a laser sensor, a turning mechanism, and a controller. The mounting table extendably supports the arm, and is mounted with the load. The laser sensor is provided on the mounting table and detects presence or absence of an object on an irradiation line of laser light. The turning mechanism horizontally turns the laser sensor. The controller horizontally turns the laser sensor and detects the presence or absence of an object in each of a plurality of locations on a shelf, to determine the presence or absence of an object in a load mounting location and the presence or absence of an object in a location, on the side of the mounting location, to which the arm is to be extended.

Horizontally turning the laser sensor enables detection of the presence or absence of an object in a load mounting location by one laser sensor, as first-in item detection. It further enables detection of the presence or absence of an object in the location, on the side of the mounting location, to which the arm is to be extended, as space detection.

As thus described, both the first-in item detection and the space detection are able to be performed by one laser sensor, thus achieving a reduction in the number of sensors and the assembly time as compared to the conventional technique.

The arm may be able to transfer the load to two mounting locations on the front side and the rear side of the shelf. In this case, the controller determines the presence or absence of an object in each of two regions with different distances from the laser sensor, to determine the presence or absence of an object in the mounting location on the front side and the presence or absence of an object in the mounting location on the rear side.

As thus described, it is possible to detect the presence or absence of an object in each of two regions with different distances from the laser sensor on an irradiation line of laser light, and further, by horizontally turning the laser sensor, it is possible to change an orientation of the laser sensor. That is, it is possible to detect the presence or absence of an object in the mounting location on the front side and the presence or absence of an object in the mounting location on the rear side.

In the conventional technique, when the presence or absence of an object in each of two mounting locations, i.e., the mounting location on the front side and the mounting location on the rear side, with different distances from the laser sensor, is to be detected by using the photoelectric sensor, the photoelectric sensor needs to be provided for each mounting location. In contrast, the side arm transfer device according to a preferred embodiment of the present invention is able to perform the detection by one laser sensor as described above, thus achieving reduction in the number of sensors as compared to the case of using the photoelectric sensors as in the related art.

Three of the arms may be arranged as a first arm, a second arm, and a third arm parallel or substantially parallel to each other at predetermined intervals on the mounting table. In this case, a load can be transferred to each of the two mounting locations on the front side and the rear side of the shelf by the second arm at a center and the first arm. Simultaneously with transfer of the load to each of the two mounting locations by the second arm and the first arm, a load can be transferred to each of two mounting locations on the front side and the rear side, which are adjacent to the above two mounting locations, by the second arm and the third arm. The laser sensor is arranged near the second arm. The controller determines the presence or absence of an object in each of the four mounting locations on the shelf by using the laser sensor, and determines the presence or absence of an object in a location to which the second arm is to be extended.

In the conventional technique, when the presence or absence of an object in each of the four mounting locations and the presence or absence of an object in a location, on the side of each of the four mounting locations, to which the second arm is to be extended, are to be detected by using the photoelectric sensor, one photoelectric sensor is required for each of the detection, and hence eight photoelectric sensors are required.

In contrast, the side arm transfer device according to a preferred embodiment of the present invention is able to perform the detection by one laser sensor, thus achieving reduction in the number of sensors.

The side arm transfer device may include a first photoelectric sensor, a second photoelectric sensor, a third photoelectric sensor, and a fourth photoelectric sensor. In this case, the first photoelectric sensor is arranged on the mounting table near the first arm, with an arm extending direction as a reference, and detects the presence or absence of an object in a location, on the side of the mounting location on the front side of the shelf, to which the first arm is to be extended. The second photoelectric sensor is arranged on the mounting table near the first arm, and detects the presence or absence of an object in a location, on the side of the mounting location on the rear side of the shelf, to which the first arm is to be extended. The third photoelectric sensor is arranged on the mounting table near the third arm, and detects the presence or absence of an object in a location, on the side of the mounting location on the front side of the shelf, to which the third arm is to be extended. The fourth photoelectric sensor is arranged on the mounting table near the third arm, and detects the presence or absence of an object in a location, on the side of the mounting location on the rear side of the shelf, to which the third arm is to be extended. The controller determines the presence or absence of the object in each of the regions based on a detection result of each of the first photoelectric sensor, the second photoelectric sensor, the third photoelectric sensor, and the fourth photoelectric sensor.

Since the first and third arms detect a small number of locations as compared to the second arm, and further, loads are arranged only on one sides thereof, a space for providing each of the sensors is ensured. Hence the photoelectric sensors may be used instead of the laser sensors as described above without a problem.

According to various preferred embodiments of the present invention, both the first-in item detection and the space detection is able to be performed by one laser sensor, thus allowing provision of a side arm transfer device which is more easily assembled.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 14A is a control flowchart for the first-in item detection and the space detection of the side arm transfer device illustrated in FIG. 4.

DETAILED DESCRIPTION OF THE PREFERRED EMBODIMENTS

In the following, preferred embodiments of the present invention will be described with reference to the drawings.

Figure 1:
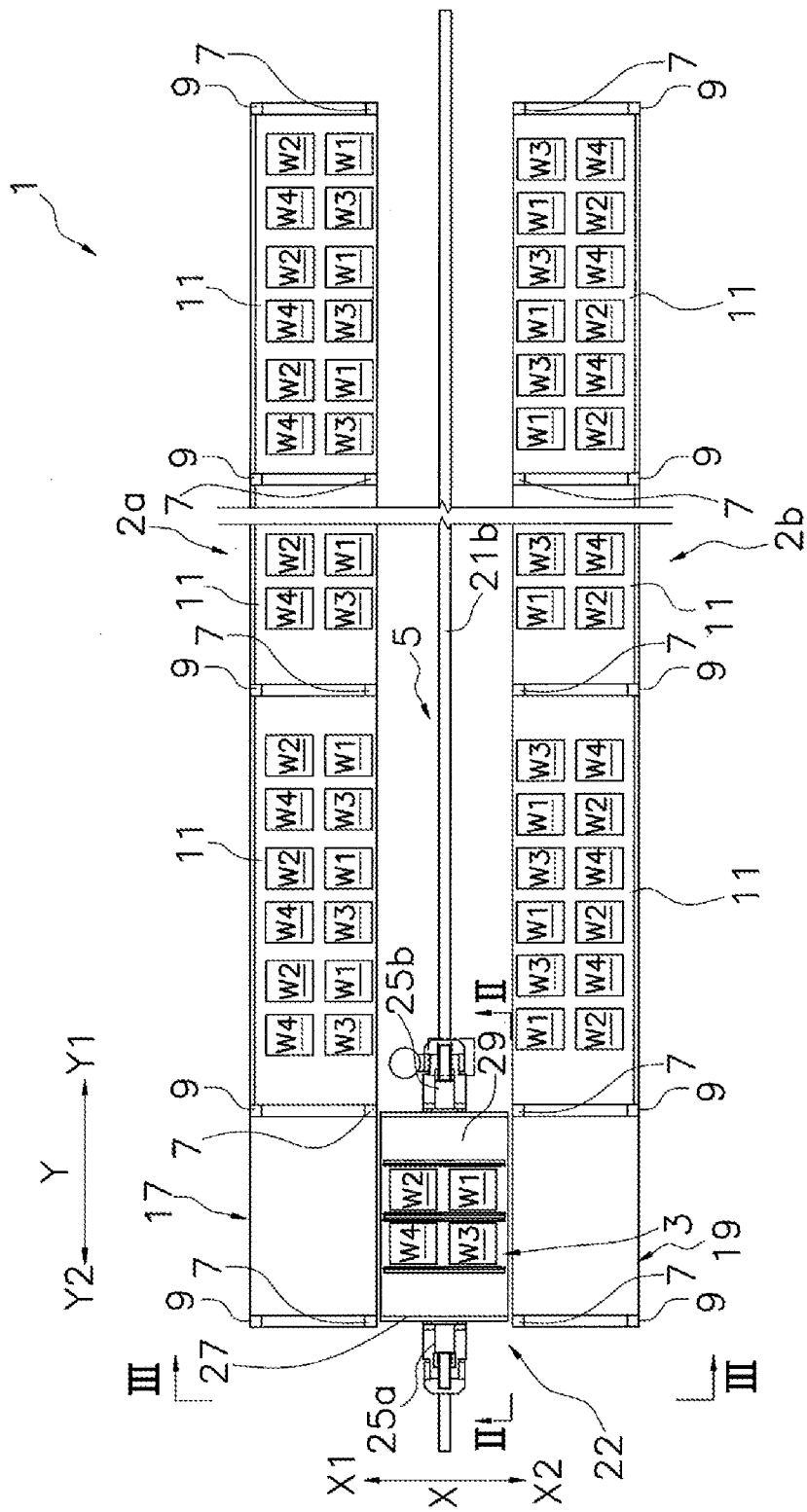
FIG. 1 a schematic plan view of an automated warehouse including a side arm transfer device according to a preferred embodiment according to the present invention.

An automated warehouse 1 including a side arm transfer device according to a preferred embodiment of the present invention will be described below. FIG. 1 a schematic plan view of the automated warehouse 1. Note that, in the present preferred embodiment, a vertical direction of FIG. 1 is a front-rear X-direction of the automated warehouse 1, where X1 denotes a forward direction and X2 denotes a backward direction. Further, a left-right direction of FIG. 1 is a left-right Y-direction of the automated warehouse 1, where Y1 denotes a rightward direction and Y2 denotes a leftward direction. Except for the case in which a viewing direction is specified, the front side indicates the X1-direction side, the rear side indicates the X2-direction side, the right side indicates the Y1-direction side, and the left side indicates the Y2-direction side.

As illustrated in FIG. 1, the automated warehouse 1 in the present preferred embodiment preferably includes a front rack 2a, a rear rack 2b, and a stacker crane 3 that travels therebetween.

The front rack 2a and the rear rack 2b are arranged in front and rear of a travelling path 5 for the stacker crane 3 extending in the left-right Y-direction so as to sandwich the travelling path 5. The front rack 2a and the rear rack 2b include a plurality of first poles 7 arranged in the left-right direction at predetermined intervals on the travelling path 5 side, a plurality of second poles 9 arranged in the left-right direction at predetermined intervals on the opposite side across the travelling path 5, and a plurality of load storage shelves 11 provided between adjacent first poles 7 and second poles 9. As illustrated in FIG. 1, three sets of loads W, one set including four loads W, are arranged on the load storage shelf 11. The four loads W are arranged at predetermined intervals in the front-rear and left-right directions.

In FIG. 1, when the four loads are seen from the stacker crane 3, W1 denotes a load arranged on the right front side, W2 denotes a load arranged on the right rear side, W3 denotes a load arranged on the left front side, and W4 denotes a load arranged on the left rear side.

A receiving station 17 that is structured to receive loads W is arranged on the load storage shelf 11 at the lowest stage on the left side of the front rack 2a. A delivery station 19 that delivers loads W is arranged on the load storage shelf 11 at the lowest stage on the left side of the rear rack 2b. Four loads W can be received in the receiving station 17 and delivered from the delivery station 19, for example.

Figure 2:
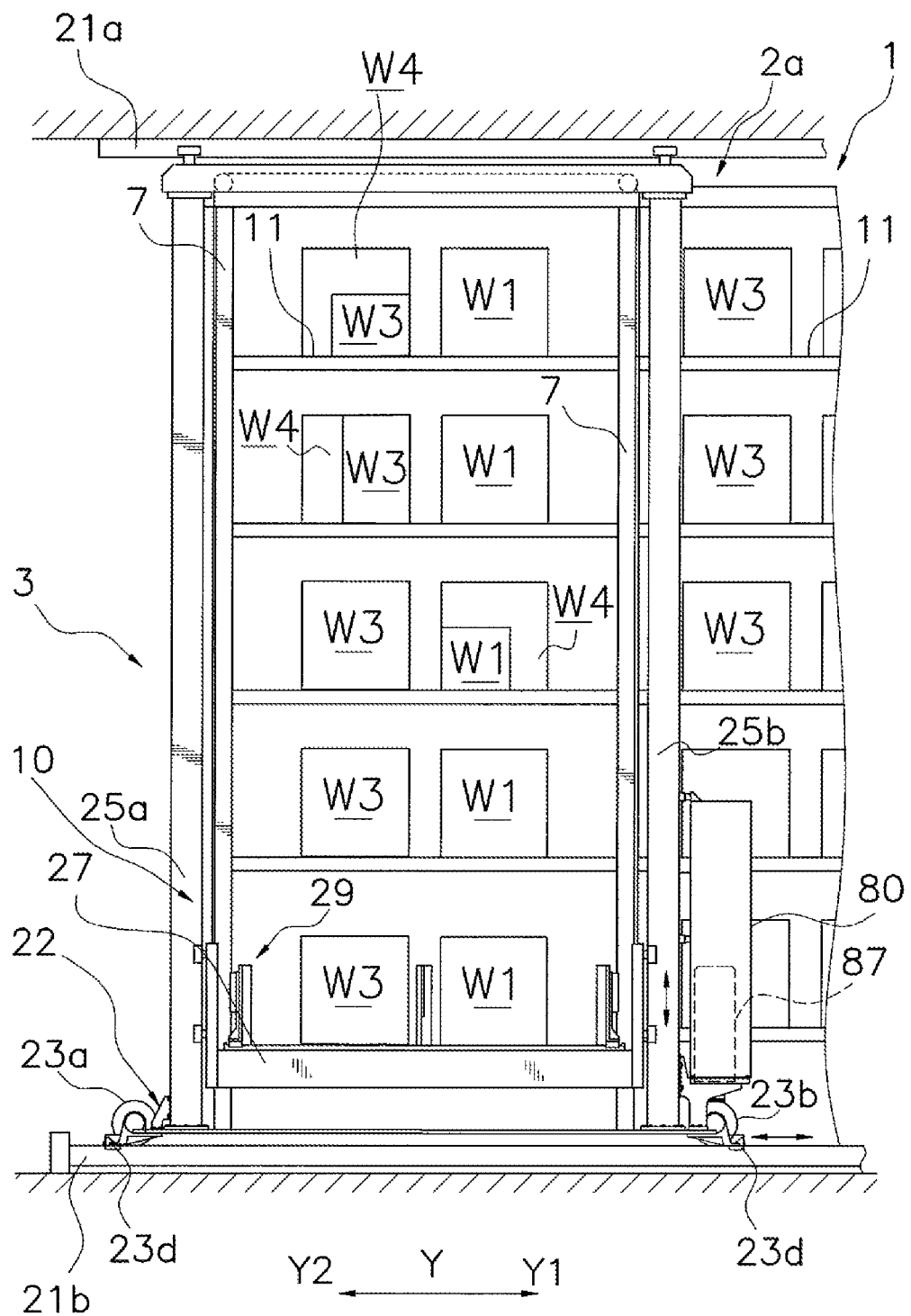
FIG. 2 is an arrow view of II-II of FIG. 1, and is a view for describing a rack and a stacker crane.
Figure 3:
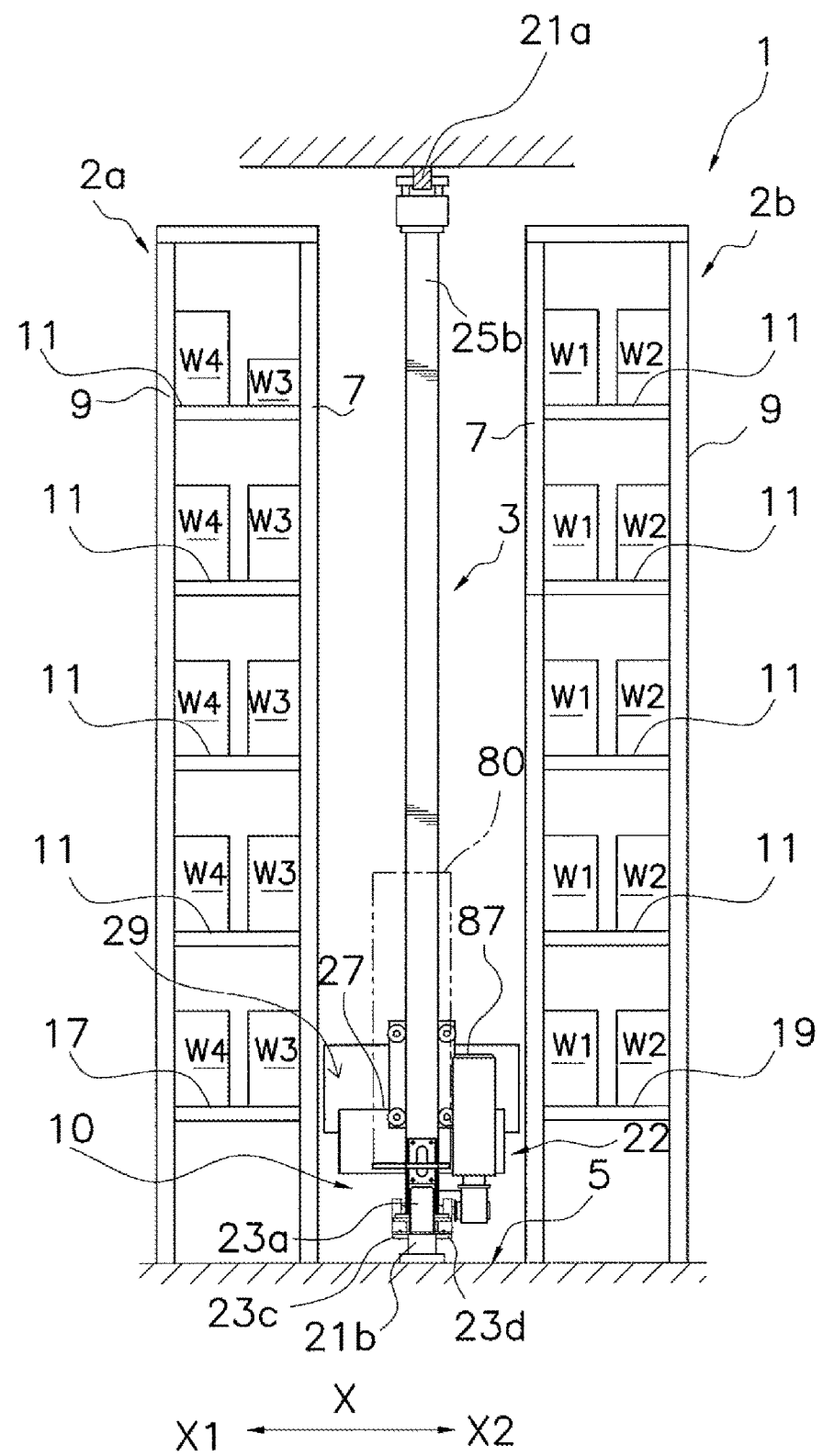
FIG. 3 is an arrow view of III-III of FIG. 1, and is a view for describing the rack and the stacker crane.

FIG. 2 is an arrow view of II-II of FIG. 1. FIG. 3 is an arrow view of III-III of FIG. 1. As illustrated in FIGS. 1 to 3, an upper guide rail 21a and a lower guide rail 21b are provided along the travelling path 5. The stacker crane 3 is movably guided by the upper guide rail 21a and the lower guide rail 21b in the left-right Y-direction. The stacker crane 3 conveys loads W among the receiving station 17, the plurality of load storage shelves 11, and the delivery station 19.

As illustrated in FIGS. 2 and 3, the stacker crane 3 includes a side arm transfer device 29, a travelling carriage 22 that causes the side arm transfer device 29 travel in the left-right direction, and a lift 10 that lifts or lowers the side arm transfer device 29.

The travelling carriage 22 includes, at its both end portions in the left-right Y-direction, a left travelling wheel 23a and a right travelling wheel 23b. The left travelling wheel 23a and the right travelling wheel 23b are rotatably supported by the travelling carriage 22 by bearings, and travel on the lower guide rail 21b.

As illustrated in FIG. 3, the travelling carriage 22 is guided to the lower guide rail 21b by a front guide roller 23c and a rear guide roller 23d which are arranged as a pair at both ends of the lower guide rail 21b across the lower guide rail 21b. In FIG. 2, the front guide roller 23c is arranged at the same location as the rear guide roller 23d across the lower guide rail 21b. The right travelling wheel 23b is driven by a travelling motor 87.

The lift 10 includes a left mast 25a and a right mast 25b extending in the vertical direction. The left mast 25a and the right mast 25b are fixed to the insides of the left travelling wheel 23a and the right travelling wheel 23b of the travelling carriage 22.

A lifting table 27 included in the side arm transfer device 29 is liftably mounted on the left mast 25a and the right mast 25b provided on the travelling carriage 22. Note that, a description of the structure that lifts and lowers the lifting table 27 (e.g., a motor or the like) will be omitted.

Further, a control board 80 which houses a crane controller 81 configured or programmed to control the stacker crane 3 is attached to the right mast 25b.

The side arm transfer device 29 is liftably attached to the left mast 25a and the right mast 25b, and transfers loads W among the receiving station 17, the load storage shelf 11, and the delivery station 19.

The side arm transfer device 29 includes the lifting table 27, a right-side arm 100, a central arm 110, a left-side arm 120, and a conveyor 200.

Figure 4:
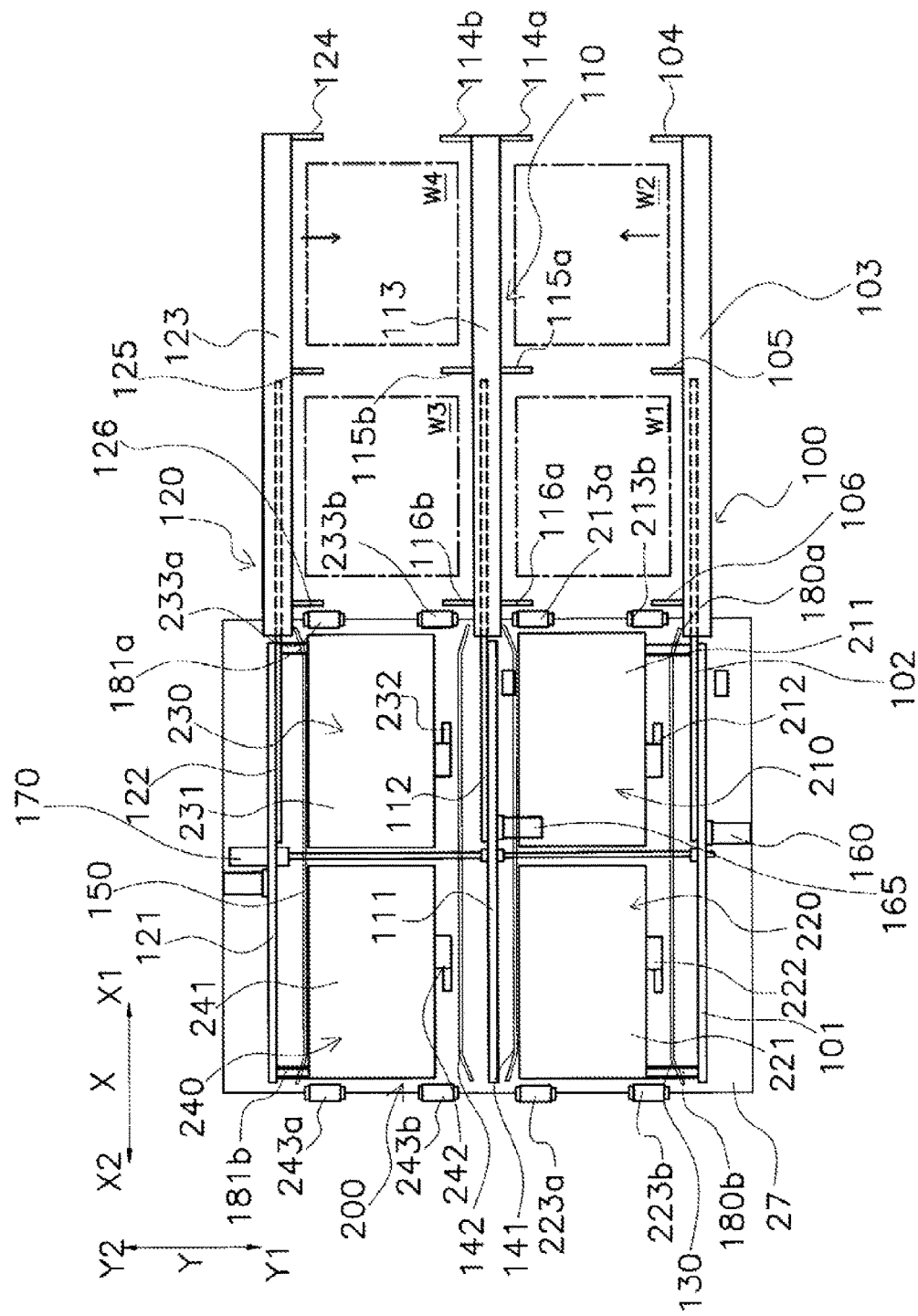
FIG. 4 is a schematic plan view illustrating a side arm transfer device according to a preferred embodiment of the present invention.

FIG. 4 is a schematic plan view of the side arm transfer device 29 of the present preferred embodiment.

The conveyor 200 is provided on the upper surface side of the lifting table 27. As illustrated in FIG. 4, the conveyor 200 includes a right front-side conveyor 210, a right rear-side conveyor 220, a left front-side conveyor 230, and a left rear-side conveyor 240.

The right front-side conveyor 210 and the right rear-side conveyor 220 are arranged on the right-hand side of the lifting table 27 at predetermined intervals along the front-rear direction. The front-side conveyor 210 includes an endless belt 211 and a motor 212 for rotating the belt 211. The belt 211 is rotated in the front-rear direction by rotation of the motor 212, to allow movement of a load W. Further, the rear-side conveyor 220 includes an endless belt 221 and a motor 222 for rotating the belt 221. The belt 221 is rotated in the front-rear direction by rotation of the motor 222, to allow movement of a load W on the belt 221.

The left front-side conveyor 230 and the left rear-side conveyor 240 are arranged on the left-hand side of the lifting table 27 at predetermined intervals along the front-rear direction. The front-side conveyor 230 includes an endless belt 231 and a motor 232 for rotating the belt 231. The belt 231 is rotated in the front-rear direction by rotation of the motor 232, to allow movement of a load W. Further, the rear-side conveyor 240 includes an endless belt 241 and a motor 242 for rotating the belt 241. The belt 241 is rotated in the front-rear direction by rotation of the motor 242, to allow movement of a load W on the belt 241.

On the front side of the right front-side conveyor 210, rollers 213a, 213b are rotatably supported on the lifting table 27. The rollers 213a, 213b enable smooth movement of the load W between the front-side conveyor 210 and the load storage shelf 11 of the front rack 2a. Similarly, on the front side of the left front-side conveyor 230, rollers 233a, 233b are rotatably supported on the lifting table 27.

On the rear side of the right rear-side conveyor 220, rollers 223a, 223b are rotatably supported on the lifting table 27. The rollers 223a, 223b enable smooth movement of the load W between the rear-side conveyor 220 and the load storage shelf 11 of the rear rack 2b. Similarly, on the rear side of the left rear-side conveyor 240, rollers 243a, 243b are rotatably supported on the lifting table 27.

As illustrated in FIG. 4, the right-side arm 100, the central arm 110, and the left-side arm 120 are arranged on the lifting table 27 parallel or substantially parallel to each other at predetermined intervals. The right-side arm 100, the central arm 110, and the left-side arm 120 are extendable in the front-rear X-direction, and the right-side arm 100 and the left-side arm 120 can extend or retract to and from both sides of a load W in the left-right direction.

The right-side arm 100 is arranged on the lifting table 27 on the right side of the right front-side conveyor 210 and the right rear-side conveyor 220, along the front-side conveyor 210 and the rear-side conveyor 220. On the lifting table 27 between the right-side arm 100 and the front-side and rear-side conveyors 210, 220, a right-side guide 130 is provided in the front-rear X-direction along the right-side arm 100. The right-side guide 130 prevents a load W from making contact with the right-side arm 100.

The left-side arm 120 is arranged on the lifting table 27 on the left side of the left front-side conveyor 230 and the left rear-side conveyor 240, along the front-side conveyor 230 and the rear-side conveyor 240. On the lifting table 27 between the left-side arm 120 and the front-side and rear-side conveyors 230, 240, a left-side guide 150 is provided in the front-rear X-direction along the left-side arm 120. The left-side guide 150 prevents a load W from making contact with the left-side arm 120.

The right-side arm 100 and the right-side guide 130 movable in the left-right direction along a front-side guide rail 180a and a rear-side guide rail 180b provided on the lifting table 27. Further, the left-side arm 120 and the left-side guide 150 are movable in the left-right direction along the front-side guide rail 181*a* and the rear-side guide rail 181*b* provided on the lifting table 27.

The central arm 110 is arranged on the lifting table 27 between the right front-side and rear-side conveyors 210, 220 and the left front-side and rear-side conveyors 230, 240 such that a longitudinal direction of the central arm 110 substantially matches the front-rear X-direction. On the lifting table 27 between the central arm 110 and the right front-side and rear-side conveyors 210, 220, a first central guide 141 is provided in the front-rear X-direction along the central arm 110. Further, on the lifting table 27 between the central arm 110 and the left front-side and rear-side conveyors 230, 240, a second central guide 142 is provided in the front-rear X-direction along the central arm 110. The first central guide 141 and the second central guide 142 prevent a load W from making contact with the central arm 110.

As illustrated in FIG. 4, the right-side arm 100 includes a right-side base member 101, a right-side middle member 102, and a right-side top member 103. Lengths of the right-side base member 101, the right-side middle member 102, and the right-side top member 103 in the front-rear direction are almost the same. The right-side base member 101 is fixed to the lifting table 27. In the state where the right-side arm 100 is extended, the right-side base member 101, the right-side middle member 102, and the right-side top member 103 are sequentially arranged in the extending direction.

Figure 5:
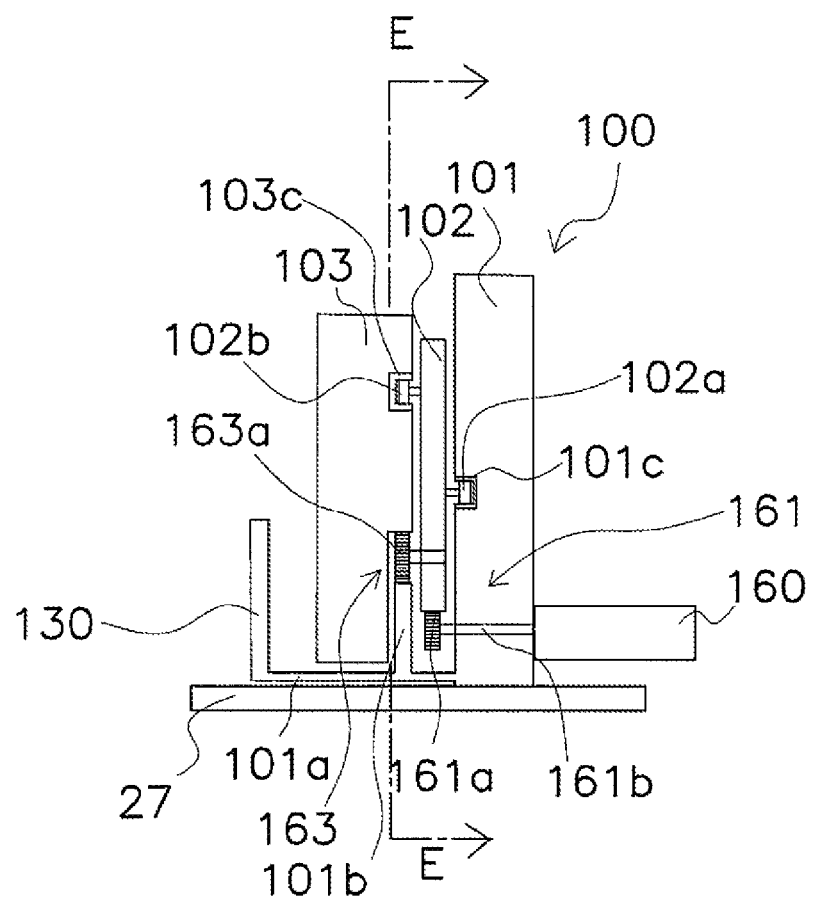
FIG. 5 is a sectional schematic view of a right-side arm of the side arm transfer device illustrated in FIG. 4.

FIG. 5 is a view schematically illustrating a cross section of the right-side arm 100. As illustrated in FIG. 5, the right-side base member 101, the right-side middle member 102, and the right-side top member 103 are sequentially arranged to the left direction.

The right-side base member 101 is provided with a right-side driving motor 160 and a gear part 161. The gear part 161 includes a gear 161*a* provided on the left-side surface of the right-side base member 101. The gear 161*a* is rotatable with a horizontal direction as an axis. The gear 161*a* is coupled to the right-side driving motor 160 by a shaft 161*b* penetrating the right-side base member 101. The upper side of the gear 161*a* is in contact with the lower end of the right-side middle member 102.

Further, in a lower portion of the left-side surface of the right-side base member 101, a coupling part 101*a* coupled with the right-side guide 130 is formed in a projecting manner.

The left side surface of the right-side middle member 102 is provided with a gear part 163. The gear part 163 includes a gear 163*a*, and the gear 163*a* is arranged rotatably with the horizontal direction as a rotational axis.

A projection 101*b* is formed upward in the middle of the coupling part 101*a* of the right-side base member 101, and the upper end of the projection 101*b* is in contact with the lower side of the gear 163*a*. Further, the upper side of the gear 163*a* is in contact with the right-side top member 103.

On the left side surface of the right-side base member 101, a guide rail 101*c* is embedded along the front-rear direction. The right side surface of the right-side middle member 102 is provided with a plurality of rollers 102*a*, engaged to the guide rail 101*c*, along the front-rear direction. By the rollers 102*a* and the guide rail 101*c*, the right-side middle member 102 is movably supported on the right-side base member 101.

On the right side surface of the right-side top member 103, a guide rail 103*c* is embedded along the front-rear direction. The left side surface of the right-side middle member 102 is provided with a plurality of rollers 102*b*, engaged to the guide rail 103*c*, along the front-rear direction. By the rollers 102*b* and the guide rail 103*c*, the right-side top member 103 is movably supported on the right-side middle member 102.

Although the number of gears provided in each of the gear part 161 and the gear part 163 is one in the present preferred embodiment for the sake of simplifying the description, the number of gears is not limited to one, and a larger number of gears may be provided.

Figure 6A:
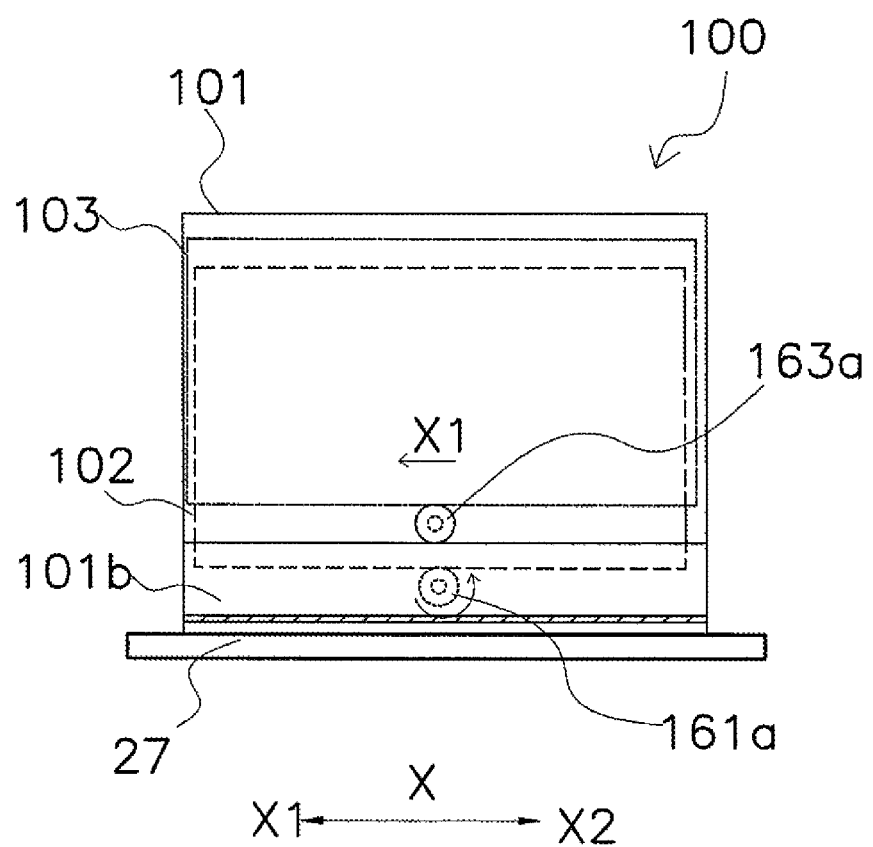
FIGS. 6A to 6C are schematic views for describing extending and retracting operations of the right-side arm illustrated in FIG. 5.

FIG. 6A is an arrow view of E-E of FIG. 5, and is a view schematically illustrating a structure of the right-side arm 100. In FIG. 6A, a roller 103*a* and the like are appropriately omitted for the sake of description. Further, in each of FIGS. 6A to 6C, the right-side base member 101 is indicated by a solid line, the right-side middle member 102 is indicated by a dotted line, and the right-side top member 103 is indicated by a dashed line.

Figure 6B:
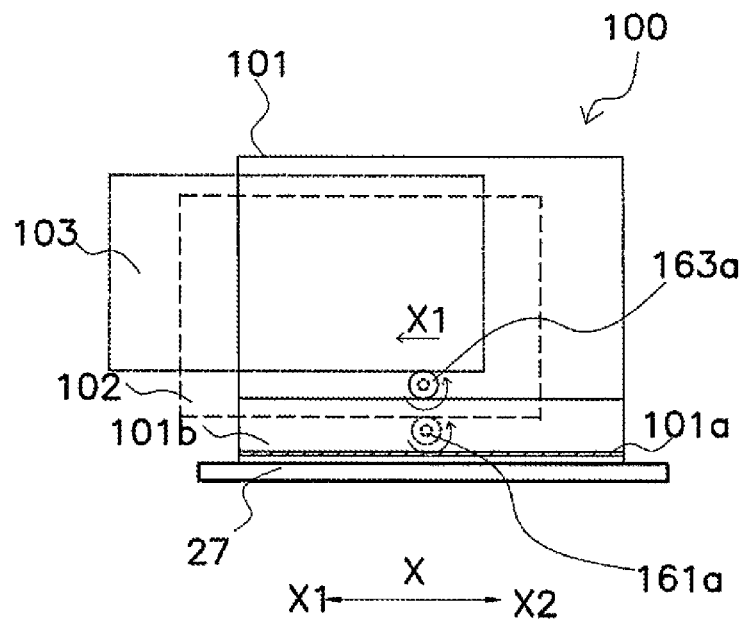
Figure 6C:
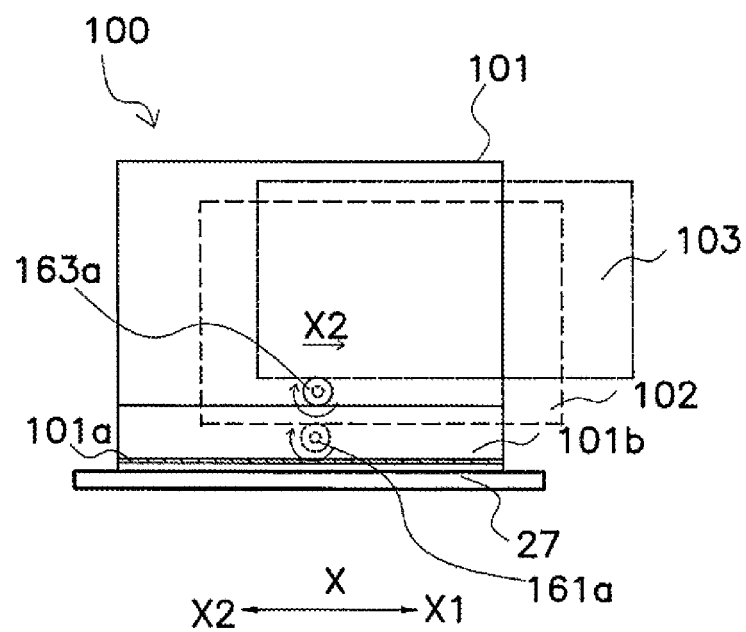

With such a configuration, the gear 161*a* is rotated when the right-side driving motor 160 is driven by a transfer controller 81*c*. As illustrated in FIG. 6A, when the gear 161*a* is rotated counterclockwise, the right-side middle member 102 moves in the direction of the arrow X1 (forward direction). By the movement of the right-side middle member 102 in the X1-direction, the gear 163*a* is rotated counterclockwise since its lower side is in contact with the projection 101*b* of the right-side base member 101. By the counterclockwise rotation of the gear 163*a*, the right-side top member 103 in contact with the gear 163*a* also moves in the direction of the arrow X1. FIG. 6B illustrates a state in which the right-side arm 100 is extended in the X1-direction. When the right-side arm 100 is to be retracted, the rotational direction of the right-side driving motor 160 is to be reversed. Further, by driving the right-side driving motor 160 so as to rotate the gear 161*a* clockwise from the state of FIG. 6A, the right-side arm 100 is able to be extended in the X2-direction (backward direction), which is opposite to X1, as illustrated in FIG. 6C.

As thus described, the right-side arm 100 is able to be extended and retracted in the front-rear direction.

Note that the left-side arm 120 is preferably line-symmetrical to the right-side arm 100, and includes a left-side base member 121, a left-side middle member 122, and a left-side top member 123, as illustrated in FIG. 4. Further, a left-side driving motor 170 that extends and retracts the left-side arm 120 is preferably provided.

The central arm 110 preferably has a structure similar to the right-side arm 100, and includes a central base member 111, a central middle member 112, and a central top member 113. Further, a central driving motor 165 that extends and retracts the central arm 110 is provided (cf. FIG. 4). Extending and retracting structures of the central arm 110 and the left-side arm 120 are similar to that of the right-side arm 100, and hence descriptions thereof will be omitted.

As illustrated in FIG. 4, the right-side top member 103 is provided with a first hook portion 104, a second hook portion 105, and a third hook portion 106. The first hook portion 104, the second hook portion 105, and the third hook portion 106 is able to be swung to such locations in which the hook portions project toward the central top member 113. The first hook portion 104 is provided at the front-side end portion of the right-side top member 103, the second hook portion 105 is provided at the center in the front-rear direction of the right-side top member 103, and the third hook portion 106 is provided at the rear-side end portion of the right-side top member 103.

Loads W are respectively arranged between the first hook portion 104 and the second hook portion 105, and between the second hook portion 105 and the third hook portion 106.

As illustrated in FIG. 4, the left-side top member 123 is provided with a first hook portion 124, a second hook portion 125, and a third hook portion 126. The first hook portion 124, the second hook portion 125, and the third hook portion 126 are able to be swung to such locations in which the hook portions project toward the central top member 113. The first hook portion 124 is provided at the front-side end portion of the left-side top member 123, the second hook portion 125 is provided at the center in the front-rear direction of the left-side top member 123, and the third hook portion 126 is provided at the rear-side end portion of the left-side top member 123.

Loads W are respectively arranged between the first hook portion 124 and the second hook portion 125, and between the second hook portion 125 and the third hook portion 126.

As illustrated in FIG. 4, the central top member 113 is provided with a right-side first hook portion 114a, a left-side first hook portion 114b, a right-side second hook portion 115a, a left-side second hook portion 115b, a right-side third hook portion 116a, and a left-side third hook portion 116b. The right-side first hook portion 114a, the right-side second hook portion 115a, and the right-side third hook portion 116a are able to be swung to such locations in which the hook portions project toward the right-side top member 103. The left-side first hook portion 114b, the left-side second hook portion 115b, and the left-side third hook portion 116b are able to be swung to such locations in which the hook portions project toward the left-side top member 123. The right-side first hook portion 114a and the left-side first hook portion 114b are provided at the front-side end portion of the central top member 113, the right-side second hook portion 115a and the left-side second hook portion 115b are provided at the center in the front-rear direction of the central top member 113, and the right-side third hook portion 116a, and the left-side third hook portion 116b are provided at the rear-side end portion of the central top member 113. Note that the right-side first hook portion 114a faces the first hook portion 104, the right-side second hook portion 115a faces the second hook portion 105, and the right-side third hook portion 116a faces the third hook portion 106. Further, the left-side first hook portion 114b faces the first hook portion 124, the left-side second hook portion 115b faces the second hook portion 125, and the left-side third hook portion 116b faces the third hook portion 126.

Figure 8:
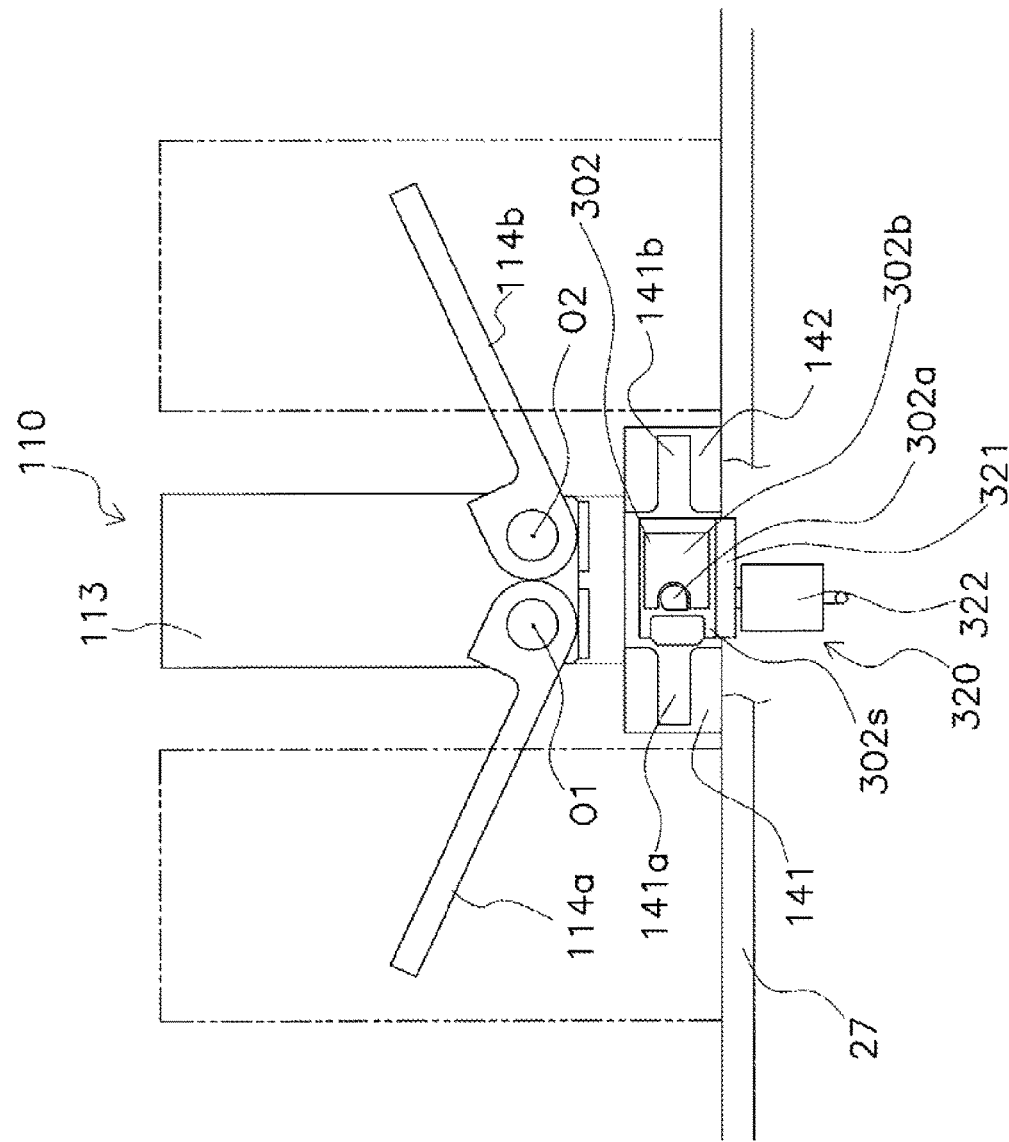
FIG. 8 is a front view illustrating a front end portion of a central arm of the side arm transfer device illustrated in FIG. 4.

Configurations of the right-side first hook portion 114a and the left-side first hook portion 114b will be described with reference to FIG. 8 below. FIG. 8 is a view of the central top member 113 seen from the front side.

As illustrated in FIG. 8, the tip of the central top member 113 is provided with two hook portions, the right-side first hook portion 114a and the left-side first hook portion 114b. The upper ends of the right-side first hook portion 114a and the left-side first hook portion 114b are swung to the right and left with lower-side swing shafts O1, O2 as the center. Thus, the right-side first hook portion 114a projects toward the right-side arm 100, and the left-side first hook portion 114b projects toward the central arm 110.

Note that, each of the hook portions is provided with a driving motor, which is controlled by the transfer controller 81c as described later.

The side arm transfer device 29 of the present preferred embodiment is able to simultaneously transfer four loads W to the load storage shelf 11 by using the right-side arm 100, the central arm 110, and the left-side arm 120.

The side arm transfer device 29 of the present preferred embodiment is preferably provided with six laser sensors 301 to 306, for example. The six laser sensors 301 to 306 are provided on the lifting table 27.

Figure 7:
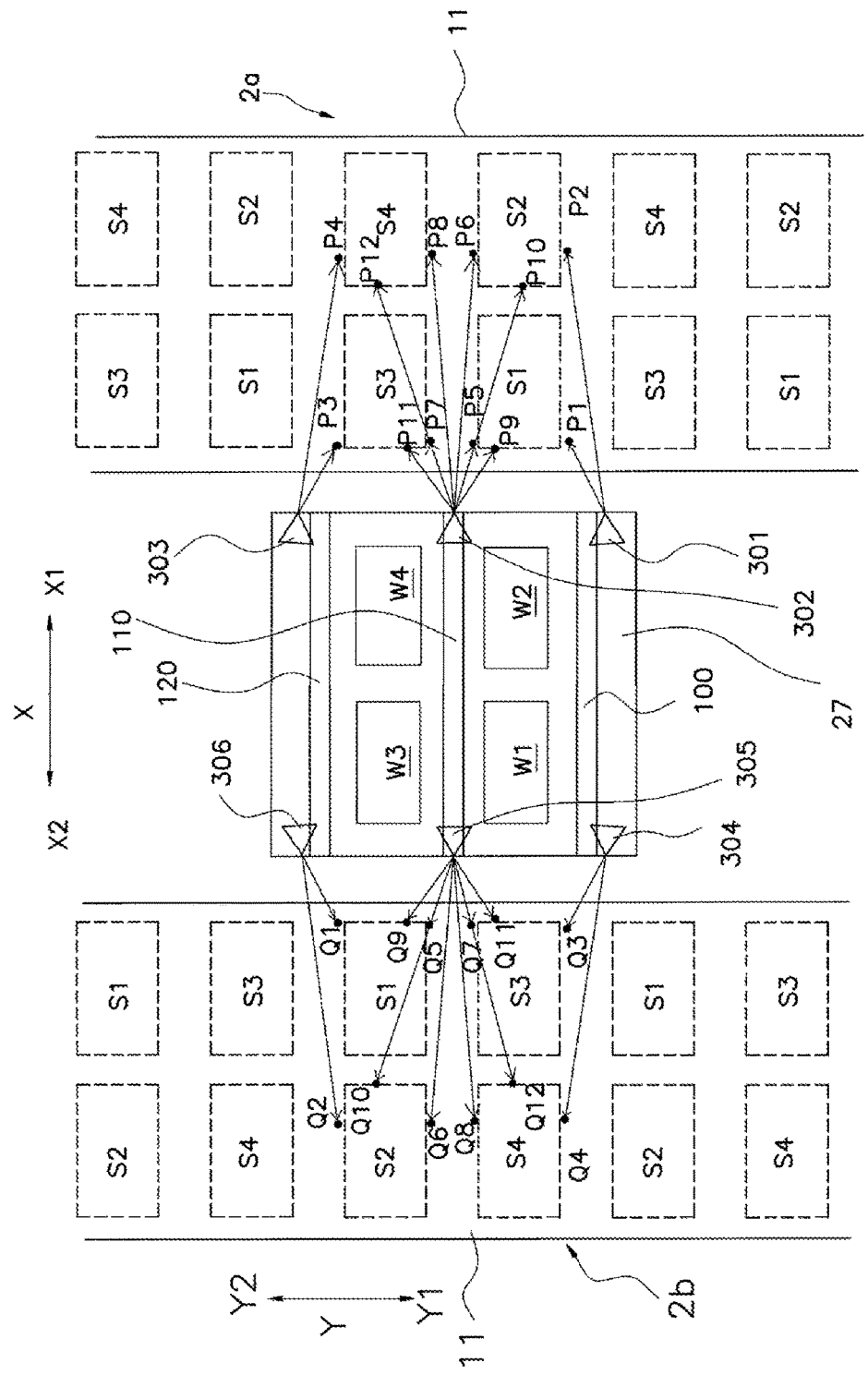
FIG. 7 is a view illustrating portions detected by the laser sensors of the side arm transfer device illustrated in FIG. 4.

FIG. 7 is a schematic plan view of the side arm transfer device of the present preferred embodiment, and is a view illustrating arrangement of the laser sensors 301 to 306. In FIG. 7, S denotes a mounting location for arranging a load W, and S1, S2, S3, S4 denote mounting locations where the loads W1, W2, W3, W4 are to be arranged. When the four mounting locations S1, S2, S3, S4 are seen from the stacker crane 3, S1 denotes a mounting location on the right front side, S2 denotes a mounting location on the right rear side, S3 denotes a mounting location on the left front side, and S4 denotes a mounting location on the left rear side.

As illustrated in FIG. 7, laser sensors 301, 302, 303 are provided near the respective front ends of the right-side arm 100, the central arm 110, and the left-side arm 120. Further, laser sensors 304, 305, 306 are provided near the respective rear ends of the right-side arm 100, the central arm 110, and the left-side arm 120.

The laser sensors 301 to 306 preferably are all TOF (Time of Flight) laser sensors, and are able to detect the presence or absence of an object at predetermined distances from the laser sensors 301 to 306. Although details will be described later, two distance regions in which detection of the laser sensors 301 to 306 is done, are set in the transfer controller 81c of the side arm transfer device 29. Thus, the transfer controller 81c is able to determine the presence or absence of an object in two regions with different distances on each of irradiation lines of the laser sensors 301 to 306. Note that, in the present preferred embodiment, examples of the object include a load W, the first pole 7, the second pole 8, and other obstacles.

Further, each of the laser sensors 301 to 306 is provided with a turning mechanism that horizontally turns the sensor. The turning mechanism will be described later by taking the laser sensor 302 as an example.

Next, a description will be given of a portion in which the presence or absence of an object is detected using each of the laser sensors 301 to 306. As described later in FIG. 13, the detected portion actually has a width (region) on the irradiation line of laser light, but in FIG. 7, the portion is illustrated by a point so as to describe a schematic configuration.

The laser sensor 301 is used to detect the presence or absence of an object in a detected portion P1 on the right side of the mounting location S1 of the front rack 2a. This allows detection (space detection) as to whether or not a portion for the right-side arm 100 to enter is ensured on the right side of the mounting location S1. Further, the laser sensor 301 is used to detect the presence or absence of an object in a detected portion P2 on the right side of the mounting location S2. This allows detection (space detection) as to whether or not a portion for the right-side arm 100 to enter is ensured on the right side of the mounting location S2.

The laser sensor 303 is used to detect the presence or absence of an object in a detected portion P3 on the left side of the mounting location S3 of the front rack 2a, and to detect the presence or absence of an object in a detected portion P4 on the left side of the mounting location S2. This allows detection (space detection) as to whether or not a portion for the left-side arm 120 to enter is ensured on the left side of each of the mounting locations S3, S4.

The laser sensor 302 is used to detect the presence or absence of an object in each of a detected portion P9 at the rear end of the mounting location S1 of the front rack 2a, a detected portion P10 at the rear end of the mounting location S2, a detected portion P11 at the rear end of the mounting location S3, a detected portion P12 at the rear end of the mounting location S4, a detected portion P5 on the left side of the mounting location S1, a detected portion P6 on the left side of the mounting location S2, a detected portion P7 on the right side of the mounting location S3, and a detected portion P8 on the right side of the mounting location S4. Detecting the presence or absence of an object in each of the detected portions P9, P10, P11, P12 enables detection of a first-in item in each of the mounting locations S1, S2, S3, S4. Further, detecting the presence or absence of an object in each of the detected portion P5 on the left side of the mounting location S1, the detected portion P6 on the left side of the mounting location S2, the detected portion P7 on the right side of the mounting location S3, the detected portion P8 on the right side of the mounting location S4 enables detection as to whether or not a space for the central arm 110 to enter is ensured.

Similarly to the above, the laser sensor 306 is used to detect the presence or absence of an object in a detected portion Q1 on the left side of the mounting location S1 of the rear rack 2b, and to detect the presence or absence of an object in a detected portion Q2 on the left side of the mounting location S2. This allows detection (space detection) as to whether or not a portion for the left-side arm 120 to enter is ensured on the left side of each of the mounting locations S1, S2

The laser sensor 304 is used to detect the presence or absence of an object in a detected portion Q3 on the right side of the mounting location S3 of the rear rack 2b, and to detect the presence or absence of an object in a detected portion Q4 on the right side of the mounting location S4. This allows detection (space detection) as to whether or not a portion for the right-side arm 100 to enter is ensured on the right side of each of the mounting locations S3, S4.

The laser sensor 305 is used to detect the presence or absence of an object in each of a detected portion Q9 at the front end of the mounting location S1 of the rear rack 2b, a detected portion Q10 at the front end of the mounting location S2, a detected portion Q11 at the front end of the mounting location S3, a detected portion Q12 at the front end of the mounting location S4, a detected portion Q5 on the right side of the mounting location S1, a detected portion Q6 on the right side of the mounting location S2, a detected portion Q7 on the left side of the mounting location S3, and a detected portion Q8 on the left side of the mounting location S4. Detecting the presence or absence of an object in each of the detected portions Q9, Q10, Q11, Q12 enables detection of a first-in item in each of the mounting locations S1, S2, S3, S4. Further, detecting the presence or absence of an object in each of the detected portion Q5 on the right side of the mounting location S1, the detected portion Q6 on the right side of the mounting location S2, the detected portion Q7 on the left side of the mounting location S3, the detected portion Q8 on the left side of the mounting location S4 enables detection as to whether or not a space for the central arm 110 to enter is ensured.

Next, the laser sensor 302 will be taken as an example, and the configuration thereof will be described in detail.

Figure 9:
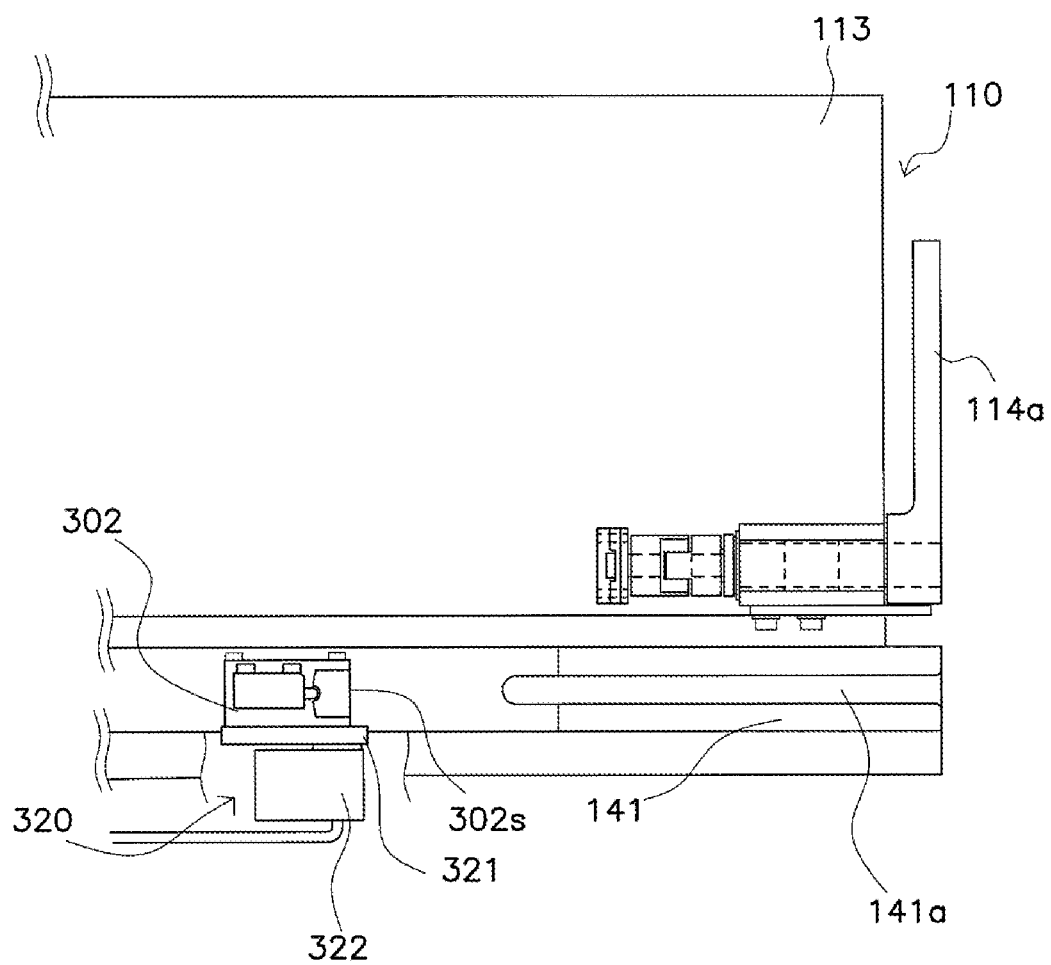
FIG. 9 is a side view illustrating the vicinity of the front end portion of the central arm of the side arm transfer device illustrated in FIG. 4.

FIG. 8 is a view of the central arm 110 seen from the front side. FIG. 9 is a view of the vicinity of the front end of the central arm 110 seen from the right side.

As illustrated in FIG. 8, the first central guide 141 and the second central guide 142 illustrated in FIG. 4 are provided on the lifting tables 27 on the right and left of the central arm 110. The laser sensor 302 is arranged on the lifting table 27 between the first central guide 141 and the second central guide 142. Further, as illustrated in FIG. 9, the laser sensor 302 is arranged slightly on the inside of the front end of the central arm 110.

The laser sensor 302 includes, on its front surface 302s, a light projector 302a that performs irradiation with laser light and a light receiver 302b that receives laser light irradiated from the light projector 302a. The light projector 302a preferably has a circular shape, and the light receiver 302b preferably surrounds the light projector 302a. The lower side of the laser sensor 302 is provided with a turning mechanism 320 that horizontally turns the laser sensor 302. The turning mechanism 320 includes a turning portion 321 arranged with the laser sensor 302, and a motor 322 provided on the lower side of the lifting table 27 to rotate the turning part 321. Further, in order to prevent laser light from being blocked when the laser sensor 302 is turned, the first central guide 141 and the second central guide 142 are provided with notches 141a, 141b from the tips toward the rear sides thereof.

Similarly, the other laser sensors 301, 303, 304, 305, 306 are horizontally turned by motors 312, 332, 342, 352, 362 of the turning mechanisms 310, 330, 340, 350, 360, and each of the turning mechanisms is controlled by the transfer controller 81c, to be described later.

Figure 10:
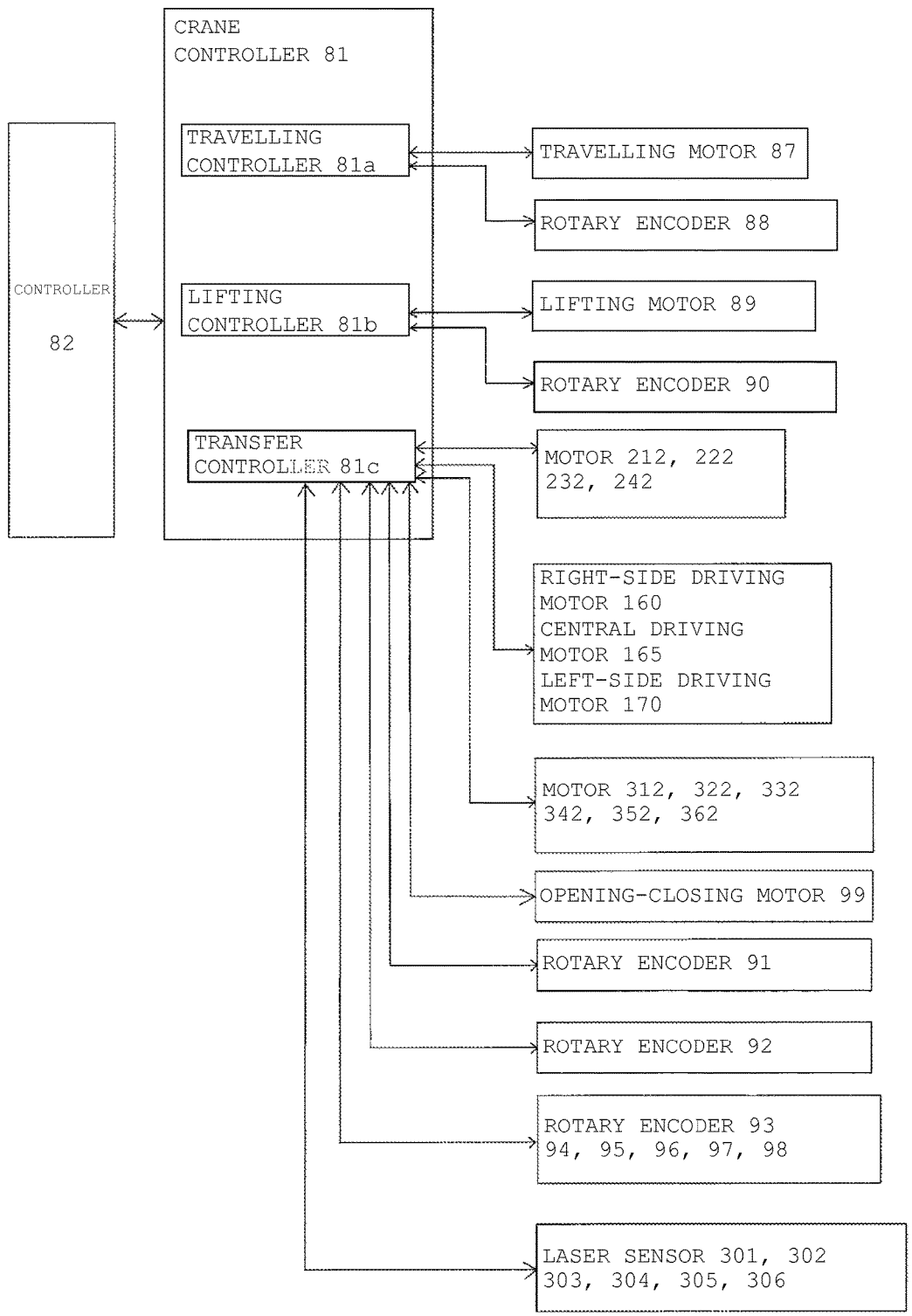
FIG. 10 is a diagram illustrating a control block of the side arm transfer device illustrated in FIG. 4.

FIG. 10 is a block diagram showing a control configuration mainly of the stacker crane 3. As illustrated in FIG. 10, the crane controller 81 of the stacker crane 3 is mounted on the control board 80 of the stacker crane 3. The crane controller 81 is configured or programmed to communicate with a controller 82 to control the entire automated warehouse 1. The crane controller 81 includes computer hardware such as a CPU and a memory, but in FIG. 10, it is expressed as a function block that is achieved by cooperation of the computer hardware and software.

The crane controller 81 is configured or programmed to include, as a functional configuration, a travelling controller 81a that controls travelling and stopping operations of the travelling carriage 22, a lifting controller 81b that controls lifting and lowering operations of the lifting table 27, and the transfer controller 81c (one example of the controller) that controls a transfer operation of the side arm transfer device 29. The travelling controller 81a is connected with the travelling motor 87 and a rotary encoder 88 to detect a travelling amount. The lifting controller 81b is connected with a lifting motor 89 and a rotary encoder 90 to detect a lifting and lowering amount.

The transfer controller 81c is connected with the motors 212, 222, 232, 242 to rotate belts 211, 221, 231, 241; the right-side driving motor 160, the central driving motor 165, and the left-side driving motor 170 to extend and retract the respective arms; an opening-closing motor 99 (not illustrated in FIG. 4) to move the right-side arm 100 and the left-side arm 120 in the left-right direction along the front-side guide rails 180a, 181a and the rear-side guide rails 180b, 181b illustrated in FIG. 4; and the motors 312, 322, 332, 342, 352, 362 to horizontally turn the laser sensors 301 to 306.

Further, the transfer controller 81c is connected with a rotary encoder 91 to detect a movement amount of each arm, a rotary encoder 92 to detect a movement amount of each arm in the left-right direction, the laser sensors 301 to 306, and rotary encoders 93, 94, 95, 96, 97, 98 to detect turning amounts of the laser sensors 301 to 306.

Next, a detailed description will be given of first-in item detection and space detection using the laser sensor.

Figure 11:
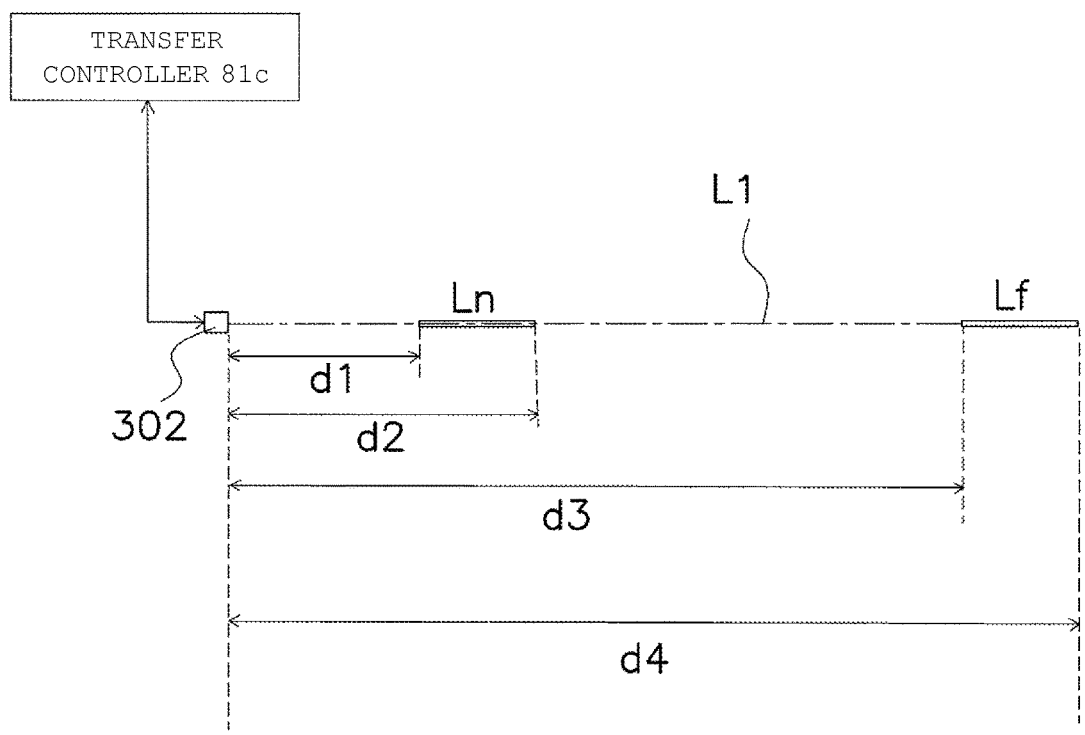
FIG. 11 is a view for describing a determination region for determining presence or absence of an object.

FIG. 11 is a view for describing detection of the presence or absence of an object in each of two regions on an irradiation line of laser light of the laser sensor 302. As described above, the laser sensor 302 preferably is a TOF (Time of Flight) laser sensor, and detects the presence or absence of an object at a predetermined distance on the irradiation line of laser light of the laser sensor 302.

The laser sensor 302 is able to obtain information of a distance to an object, from a phase difference which is generated due to the time from emission of laser light from the light projector 302a to reception of laser light reflected by the object in the light receiver 302b.

In FIG. 11, L1 denotes an irradiation line of laser light. In the transfer controller 81c, two widths of distances from the laser sensor 302 are set on the irradiation line of laser light. These two distance widths are respectively a difference between distances d1 and d2 from the laser sensor 302, and a difference between distances d3 and d4 from the laser sensor 302. Note that distances from the laser sensor 302 are set to be longer in the order of d1, d2, d3, d4. The difference between d1 and d2 is set as a first determination region Ln, and the difference between d3 and d4 is set as a second determination region Lf.

The transfer controller 81c switches the region in which the presence or absence of an object between the first determination region Ln and the second determination region Lf is determined.

In a case where the transfer controller 81c sets the region in which the presence or absence of an object is determined to the first determination region Ln, the transfer controller 81c determines that an object exists when a distance to an object detected by the laser sensor 302 is within the first determination region Ln, based on information concerning the distance obtained from the laser sensor 302. That is, even when the laser sensor 302 detects an object, if a distance to the object is other than the difference between the distances d1 and d2 (the first determination region), the transfer controller 81c does not determine that an object has been detected.

Further, in a case where the transfer controller 81c sets the region in which the presence or absence of an object is determined to the second determination region Lf, the transfer controller 81c determines that an object exists when a distance to an object detected by the laser sensor 302 is within the second determination region Lf, based on information concerning the distance obtained from the laser sensor 302. That is, even when the laser sensor 302 detects an object, if a distance to the object is other than the difference between the distances d3 and d4 (the second determination region), the transfer controller 81c does not determine that an object has been detected.

As described above, the transfer controller 81c is able to determine the presence or absence of an object in the region (Ln) of the closer distances d1 and d2 from the laser sensor 302, and in the region (Lf) of the farther distances d3 and d4 from the laser sensor 302.

Note that, the detected portions P5, P7, P9, P11 described in FIG. 7 have the same distance from the laser sensor 302, and correspond to the above d1 and d2 (the first determination region Ln). The detected portions P6, P8, P10, P12 have the same distance from the laser sensor 302, and correspond to the above d3 and d4 (the second determination region Lf). The detected portion P1 has a distance from the laser sensor 301 which corresponds to the above d1 and d2 (the first determination region Ln). The detected portion P2 has a distance from the laser sensor 301 which corresponds to the above d3 and d4 (the second determination region Lf). The detected portion P3 has a distance from the laser sensor 303 which corresponds to the above d1 and d2 (the first determination region Ln). The detected portion P4 has a distance from the laser sensor 303 which corresponds to the above d3 and d4 (the second determination region Lf).

Further, the detected portions Q5, Q7, Q9, Q11 have the same distance from the laser sensor 305, and correspond to the above d1 and d2 (the first determination region Ln). Further, the detected portions Q6, Q8, Q10, Q12 have the same distance from the laser sensor 305, and correspond to the above d3 and d4 (the second determination region Lf). The detected portion Q1 has a distance from the laser sensor 306 which corresponds to the above d1 and d2 (the first determination region Ln). The detected portion Q2 has a distance from the laser sensor 306 which corresponds to the above d3 and d4 (the second determination region Lf). The detected portion Q3 has a distance from the laser sensor 304 which corresponds to the above d1 and d2 (the first determination region Ln). The detected portion Q4 has a distance from the laser sensor 304 which corresponds to the above d3 and d4 (the second determination region Lf).

Next, operations for the first-in item detection and the space detection will be described.

The first-in item detection and the space detection are performed before loads W1 to W4 mounted on the lifting table 27 in the receiving station 17 are put down on the mounting locations S1 to S4 on the load storage shelf 11 by the side arm transfer device 29.

First, for describing the mounting locations S1 to S4, an operation to transfer loads to the load storage shelf 11 will be described.

Figure 12A:
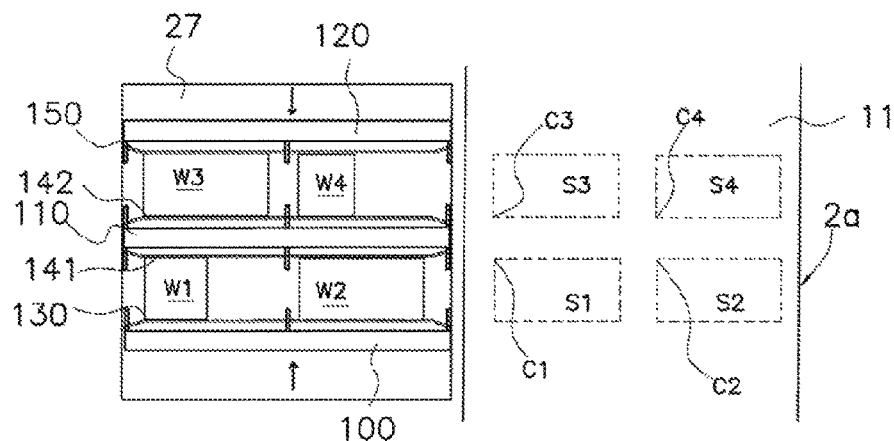
FIGS. 12A to 12C are views for describing operations to transfer loads to a load storage shelf by using the side arm transfer device illustrated in FIG. 4.
Figure 12B:
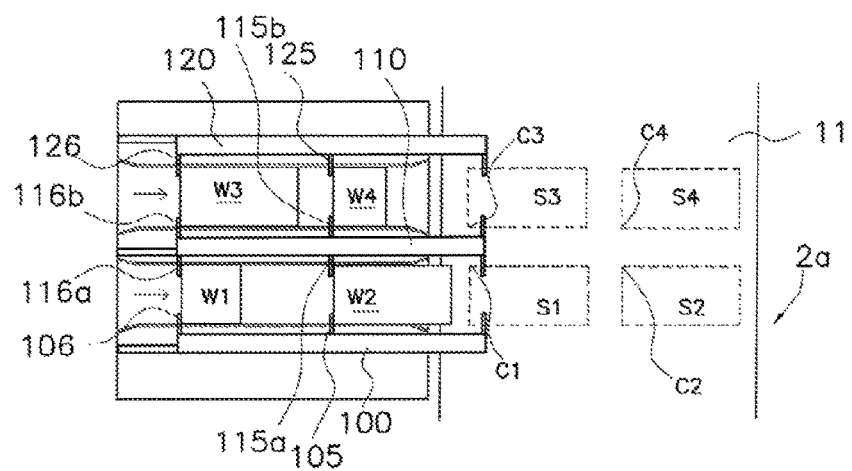
Figure 12C:
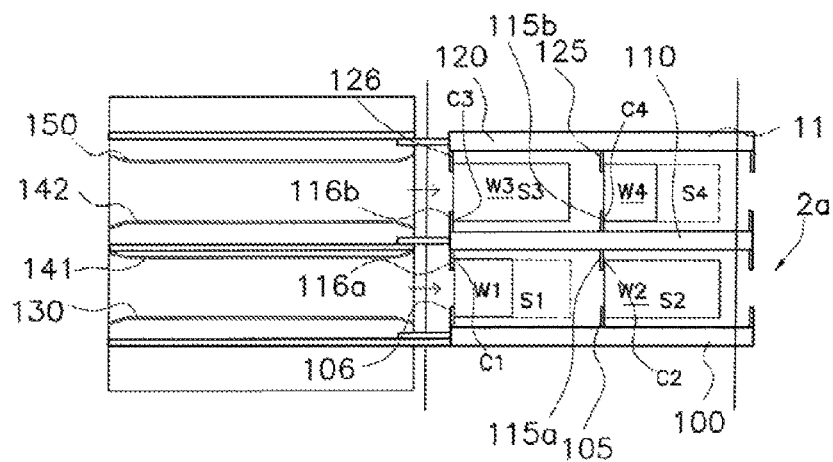

FIGS. 12A to 12C are views for describing a reference at the time of mounting loads W1 to W4 on the mounting locations S1 to S4.

In the mounting location S1, a reference of a location for mounting a load W1 is a left rear-side corner C1, and the load W1 is mounted so as to be aligned to the corner C1. Further, in the mounting location S2, a reference of a location for mounting a load W2 is a left rear-side corner C2. In the mounting location S3, a reference of a location for mounting a load W3 is a right rear-side corner C3. In the mounting location S4, a reference of a location for mounting a load W4 is a right rear-side corner C4.

When the loads W1 to W4 are to be mounted on the load storage shelf 11 by the side arm transfer device 29, as illustrated in FIG. 12A, the right-side arm 100 and the left-side arm 120 are moved to the central arm 110 side, and the loads W1 to W4 are pressed onto the first central guide 141 and the second central guide 142 of the central arm 110. Note that, an interval between the first central guide 141 and the second central guide 142 is the same as an interval between the corner C1 and the corner C3 and is the same as an interval between the corner C2 and the corner C4.

Next, as illustrated in FIG. 12B, the load W1 is pushed out to the load storage shelf 11 by the third hook portion 106 of the extending right-side arm 100 and the right-side third hook portion 116a of the extending central arm 110. Similarly, the load W2 is pushed out to the load storage shelf 11 by the second hook portion 105 of the extending right-side arm 100 and the right-side second hook portion 115a of the extending central arm 110. The load W3 is pushed out to the load storage shelf 11 by the left-side third hook portion 116b of the extending central arm 110 and the third hook portion 126 of the extending left-side arm 120. The load W4 is pushed out to the load storage shelf 11 by the left-side second hook portion 115b of the extending central arm 110 and the second hook portion 125 of the extending left-side arm 120. Note that, intervals between the second hook portions 105, 115a, 115b, 125 and the third hook portions 106, 116a, 116b, 126 are the same as an interval between the corner C1 and the corner C2 and are the same as an interval between the corner C3 and the corner C4.

Then, as illustrated in FIG. 12C, by simultaneously extending the right-side arm 100, the central arm 110, and the left-side arm 120, the loads W1 to W4 move in the front-rear direction along the first central guide 141 and the second central guide 142. The right-side arm 100, the central arm 110, and the left-side arm 120 are stopped when the right-side second hook portion 115a reaches the corner C2, the left-side second hook portion 115b reaches the corner C4, the right-side third hook portion 116a reaches the corner C1, and the left-side third hook portion 116b reaches corner C3 in the front-rear direction.

By such an operation, the loads W1 to W4 are mounted on the respective mounting locations S1 to S4 so as to be aligned to the corners C1 to C4.

In the following, the operations of the first-in item detection and the space detection will be described.

Figure 13:
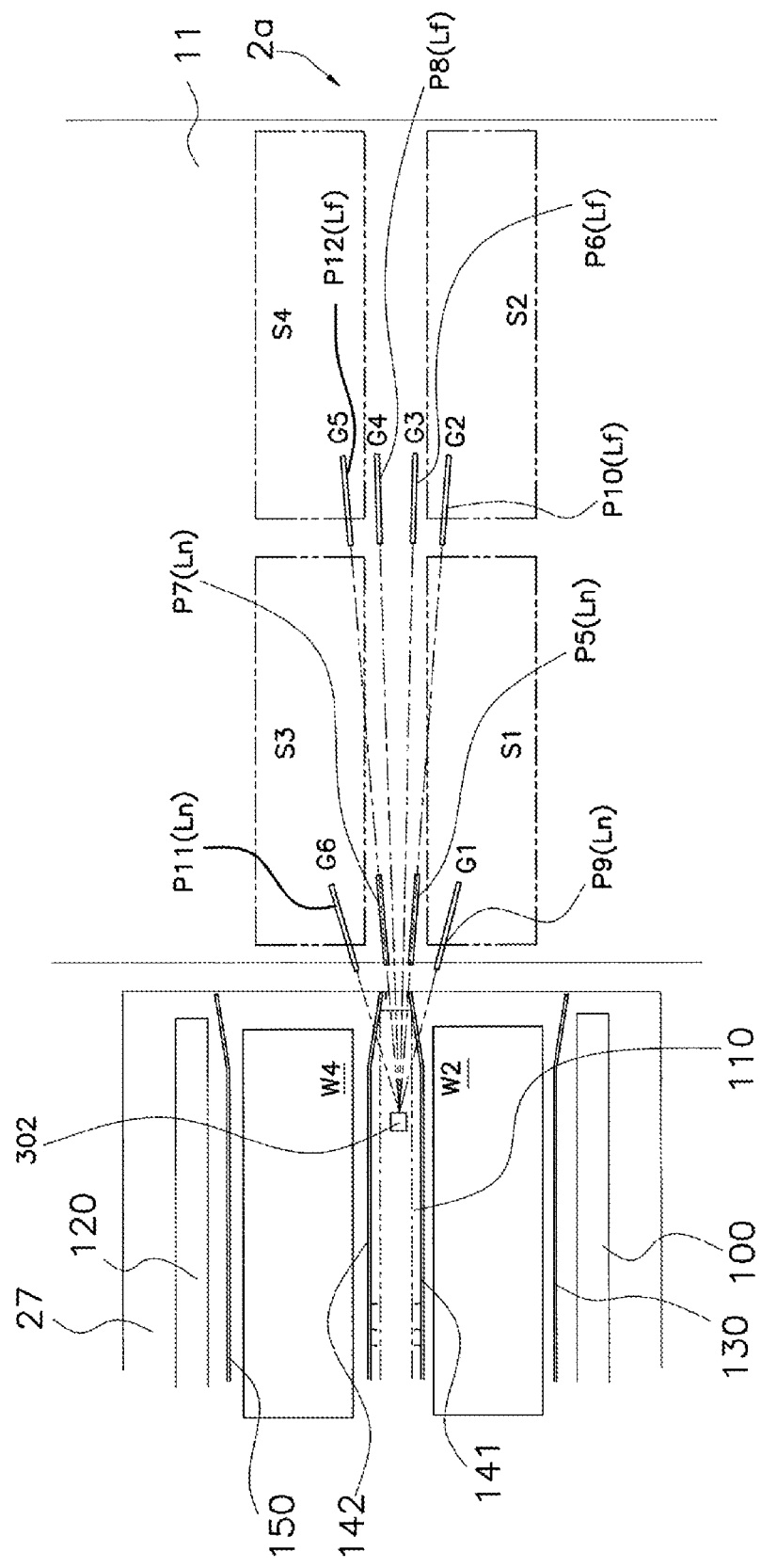
FIG. 13 is a view for describing first-in item detection and space detection of the side arm transfer device illustrated in FIG. 4.
Figure 14B:
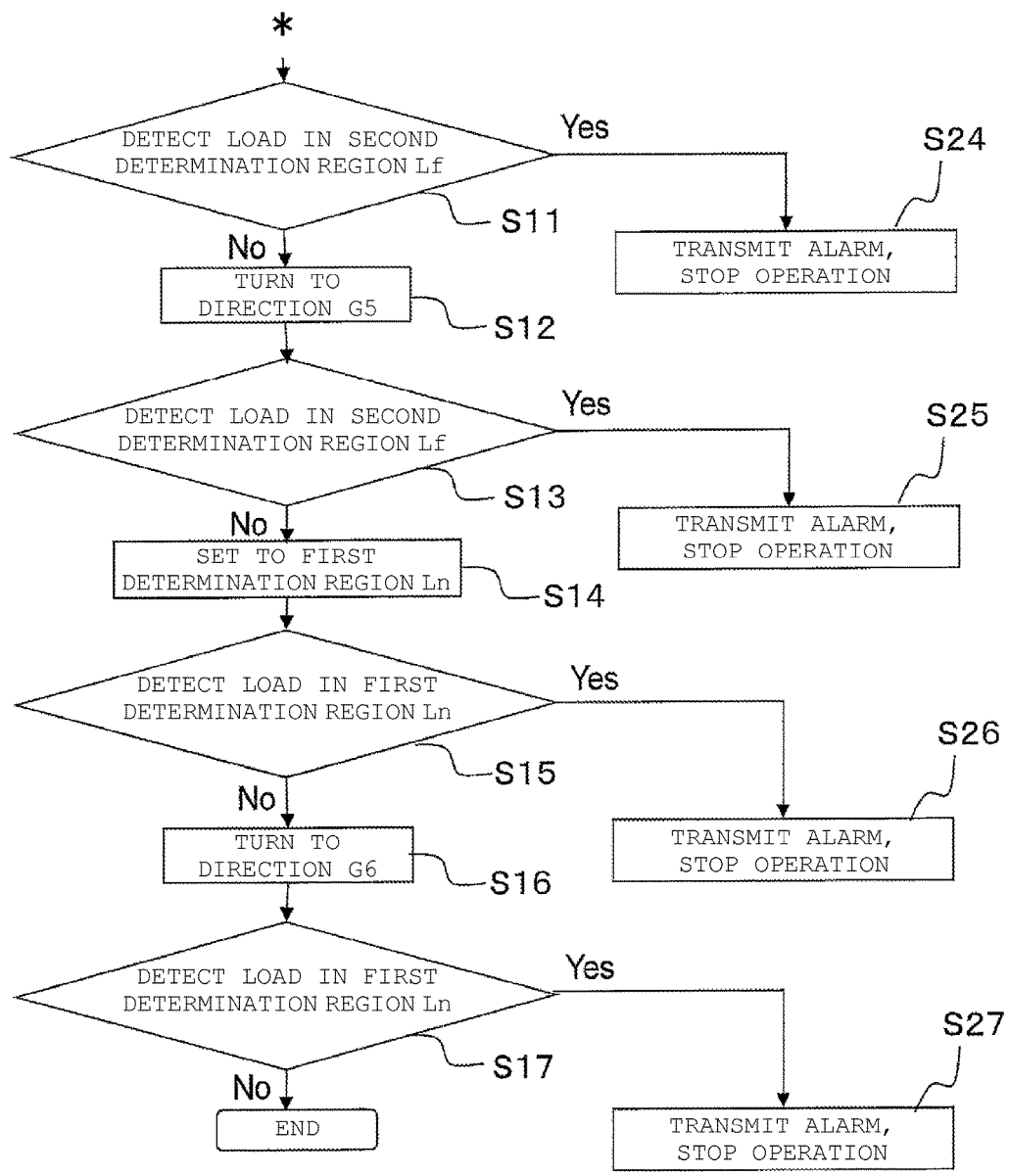
FIG. 14B is a control flowchart for the first-in item detection and the space detection of the side arm transfer device illustrated in FIG. 4.

FIG. 13 is a plan view for describing the first-in item detection and the space detection by the laser sensor 302. FIG. 13 does not illustrate the laser sensors 301, 303, but illustrates only the laser sensor 302. FIG. 14 is a control flowchart at the time of performing the first-in item detection and the space detection.

When loads W1 to W4 are mounted in the stacker crane 3 in the receiving station 17, the stacker crane 3 moves to the load storage shelf 11 on which the loads are to be received, by communication from the controller 82.

When the stacker crane 3 moves to the rear side of the load storage shelf 11, to which the loads are to be transferred, the side arm transfer device 29 performs the first-in item detection and the space detection.

First, the motor 322 is driven by the transfer controller 81c, and the laser sensor 302 is turned in a direction G1 to the detected portion P9 (cf. FIG. 7) to inspect the presence or absence of an object in the mounting location S1 (Step S1).

Then, when the laser sensor 302 is turned in the direction G1, the transfer controller 81c sets the region in which the presence or absence of an object is determined to the first determination region Ln (Step S2).

Next, the transfer controller 81c emits laser light from a light projector 301a, and determines whether or not an object has been detected in the first determination region Ln by the laser sensor 302 (Step S3).

When an object has been detected in the first determination region Ln by the laser sensor 302, the transfer controller 81c determines that an object (e.g. a load W) is mounted in the mounting location S1. Then, the transfer controller 81c transmits an alarm indicating the presence of a first-in item to the controller 82 that controls the entire automated warehouse 1, and stops the operation (Step S20).

On the other hand, when an object has not been detected in the first determination region Ln by the laser sensor 302, the transfer controller 81c determines that an object is not present in the mounting location S1. Subsequently, to detect the presence or absence of an object in the detected portion P5 (cf. FIG. 7), the motor 322 is driven, and the laser sensor 302 is horizontally turned in a counterclockwise rotational direction such that the laser irradiating direction matches a direction G2 to the detected portion P5 (Step S4).

When the laser sensor 302 is turned in the direction G2, the transfer controller 81c emits laser light from the light projector 301a, and determines whether or not an object has been detected in the first determination region Ln by the laser sensor 302 (Step S5).

When an object has been detected in the first determination region Ln by the laser sensor 302, the transfer controller 81c determines that a space for the central arm 110 to enter is not present on the left side of the mounting location S1. Then, the transfer controller 81c transmits an alarm to the controller 82 that controls the entire automated warehouse 1, and stops the operation (Step S21).

On the other hand, when an object has not been detected in the first determination region Ln by the laser sensor 302, the transfer controller 81c determines that a space for the central arm 110 to enter is present on the left side of the mounting location S1.

When determining that a space is present, the transfer controller 81c detects the presence or absence of an object in the mounting location S2, that is, the presence or absence of an object in the detected portion P10 (cf. FIG. 7).

In order to determine the presence or absence of an object in the second determination region Lf (cf. FIG. 11) with a longer distance from the laser sensor 302, the transfer controller 81c sets the region in which the presence or absence of an object is determined to the second determination region (Step S6). Since a direction to P10 from the laser sensor 302 is the same as the direction G2 to P5, the transfer controller 81c does not horizontally turn the laser sensor 302 by the motor 322.

Next, the transfer controller 81c emits laser light from the light projector 301a, and determines whether or not an object has been detected in the second determination region Lf by the laser sensor 302 (Step S7).

When an object has been detected in the second determination region Lf by the laser sensor 302, the transfer controller 81c determines that an object (e.g. a load W) is mounted in the mounting location S2. Then, the transfer controller 81c transmits an alarm indicating the presence of a first-in item to the controller 82 that controls the entire automated warehouse 1, and stops the operation (Step S22).

On the other hand, when an object has not been detected in the second determination region Lf by the laser sensor 302, the transfer controller 81c determines that an object is not present in the mounting location S2. Subsequently, to detect the presence or absence of an object in the detected portion P6 (cf. FIG. 7), the motor 322 is driven, to horizontally turn the laser sensor 302 in the counterclockwise rotational direction such that the laser irradiating direction matches a direction G3 to the detected portion P6 (Step S8).

When the laser sensor 302 is turned in the direction G3, the transfer controller 81c emits laser light from the light projector 301a, and determines whether or not an object has been detected in the second determination region Lf by the laser sensor 302 (Step S9).

When an object has been detected in the second determination region Lf by the laser sensor 302, the transfer controller 81c determines that a space for the central arm 110 to enter is not present on the left side of the mounting location S2. Then, the transfer controller 81c transmits an alarm to the controller 82 that controls the entire automated warehouse 1, and stops the operation (Step S23).

On the other hand, when an object has not been detected in the second determination region Lf by the laser sensor 302, the transfer controller 81c determines that a space for the central arm 110 to enter is present on the left side of the mounting location S2.

When the transfer controller 81c determines that the space is present, in order to detect the presence or absence of an object in the detected portion P8 (cf. FIG. 7), the transfer controller 81c drives the motor 322, to horizontally turn the laser sensor 302 in the counterclockwise rotational direction such that the laser irradiating direction matches a direction G4 to the detected portion P8 (Step S10).

When the laser sensor 302 is turned in the direction G4, the transfer controller 81c emits laser light from the light projector 301a, and determines whether or not an object has been detected in the second determination region Lf by the laser sensor 302 (Step S11).

When an object has been detected in the second determination region Lf by the laser sensor 302, the transfer controller 81c determines that a space for the central arm 110 to enter is not present on the right side of the mounting location S4. Then, the transfer controller 81c transmits an alarm to the controller 82 that controls the entire automated warehouse 1, and stops the operation (Step S24).

On the other hand, when an object has not been detected in the second determination region Lf by the laser sensor 302, the transfer controller 81c determines that a space for the central arm 110 to enter is present on the right side of the mounting location S4.

When the transfer controller 81c determines that the space is present, in order to detect the presence or absence of an object in the detected portion P12 (cf. FIG. 7), the transfer controller 81c drives the motor 322, to horizontally turn the laser sensor 302 in the counterclockwise rotational direction such that the laser irradiating direction matches a direction G5 to the detected portion P12 (Step S12).

When the laser sensor 302 is turned in the direction G5, the transfer controller 81c emits laser light from the light projector 301a, and determines whether or not an object has been detected in the second determination region Lf by the laser sensor 302 (Step S13).

When an object has been detected in the second determination region Lf by the laser sensor 302, the transfer controller 81c determines that an object (e.g. a load W) is mounted in the mounting location S4. Then, the transfer controller 81c transmits an alarm indicating the presence of a first-in item to the controller 82 that controls the entire automated warehouse 1, and stops the operation (Step S25).

On the other hand, when an object has not been detected in the second determination region Lf by the laser sensor 302, the transfer controller 81c determines that a first-in item is not present in the mounting location S4.

When determining that a first-in item is not present, the transfer controller 81c detects the presence or absence of an object in the detected portion P7 (cf. FIG. 7).

Since the detected portion P7 is the first determination region Ln with a shorter distance from the laser sensor 302 (cf. FIG. 11), to determine the presence or absence of an object in the first determination region Ln, the transfer controller 81c sets the region in which the presence or absence of an object is determined to the first determination region Ln (Step S14). Since a direction to P7 from the laser sensor 302 is the same as the direction G5 to P12, the transfer controller 81c does not horizontally turn the laser sensor 302 by the motor 322.

When the determination region is switched, the transfer controller 81c emits laser light from the light projector 301a, and determines whether or not an object has been detected in the first determination region Ln by the laser sensor 302 (Step S15).

When an object has been detected in the first determination region Ln by the laser sensor 302, the transfer controller 81c determines that a space for the central arm 110 to enter is not present on the right side of the mounting location S3. Then, the transfer controller 81c transmits an alarm to the controller 82 that controls the entire automated warehouse 1, and stops the operation (Step S26).

On the other hand, when an object has not been detected in the first determination region Ln by the laser sensor 302, the transfer controller 81c determines that a space for the central arm 110 to enter is present on the right side of the mounting location S4.

When the transfer controller 81c determines that the space is present, in order to detect the presence or absence of an object in the detected portion P11 (cf. FIG. 7), the transfer controller 81c drives the motor 322, to horizontally turn the laser sensor 302 in the counterclockwise rotational direction such that the laser irradiating direction matches a direction G6 to the detected portion P11 (Step S16).

When the laser sensor 302 is turned in the direction G6, the transfer controller 81c emits laser light from the light projector 301a, and determines whether or not an object has been detected in the first determination region Ln by the laser sensor 302 (Step S17).

When an object has been detected in the first determination region Ln by the laser sensor 302, the transfer controller 81c determines that an object (e.g. a load W) is mounted in the mounting location S3. Then, the transfer controller 81c transmits an alarm indicating the presence of a first-in item to the controller 82 that controls the entire automated warehouse 1, and stops the operation (Step S27).

On the other hand, when an object has not been detected in the first determination region Ln by the laser sensor 302, the transfer controller 81c determines that a first-in item is not present in the mounting location S3.

When it is determined that an object is not present in the mounting location S3, the first-in item detection and the space detection by the laser sensor 302 are completed.

Simultaneously with the first-in item detection and the space detection using the laser sensor 302 described above, the detection of the presence or absence of an object in each of the detected portions P1, P2 by turning the laser sensor 301 and the detection of the presence or absence of an object in each of the detected portions P3, P4 by turning the laser sensor 303 are performed. When no object is detected in all the detected portions, the transfer controller 81c transfers the loads W1 to W4 to the load storage shelf 11 as described in FIG. 12.

Note that, when the loads W1 to W4 are to be transferred to the load storage shelf 11 of the rear rack 2b, the first-in item detection and the space detection are performed similarly to the above by the laser sensors 304, 305, 306.

As described above, the detected portions P5 to P12 are able to be detected by the laser sensor 302, the detected portions P1, P2 can be detected by the laser sensor 301, and the detected portions P3, P4 are able to be detected by the laser sensor 303. Further, the detected portions Q5 to Q12 are able to be detected by the laser sensor 305, the detected portions Q1, Q2 are able to be detected by the laser sensor 306, and the detected portions Q3, Q4 are able to be detected by the laser sensor 304.

As described above, at least two detected portions are detected by one laser sensor, thus allowing reduction in the number of sensors and the time required for assembly.

Further, the references for mounting loads have been set to the corners C1 to C4 closer to the centers of the mounting locations S1 to S4, thus enabling detection of the presence or absence of an object in the detected portions P5, P6, P7, P8, P9, P10, P11, P12 by one laser sensor 302 at small turning angles.

The side arm transfer device 29 of the above-described preferred embodiment of the present invention preferably is a side arm transfer device which extends and retracts the right-side arm 100, the central arm 110, and the left-side arm 120 (one example of the arms) to and from the sides of loads to be transferred, the device including the lifting table 27 (one example of the mounting table), the laser sensors 301 to 306, the turning mechanism 320, and the transfer controller 81c (one example of the controller). The lifting table 27 extendably supports the right-side arm 100, the central arm 110, and the left-side arm 120, and is mounted with loads. The laser sensors 301 to 306 are provided on the lifting table 27, and detect the presence or absence of an object on an irradiation line of laser light. The turning mechanism 320 horizontally turns the laser sensors 301 to 306. The transfer controller 81c horizontally turns the laser sensors 301 to 306 and detects the presence or absence of an object in each of a plurality of detected portions P1 to P12 (one example of the locations) on the load storage shelf 11 (one example of the shelf), to determine the presence or absence of an object in each of the mounting locations S1 to S4 (one example of the mounting locations) and the presence or absence of an object in a location, on the side of each of the mounting locations S1 to S4, to which each of the right-side arm 100, the central arm 110, and the left-side arm 120 is to be extended.

Accordingly, by horizontally turning the laser sensors 301 to 306, it is possible to perform, as the first-in item detection, the detection of the presence or absence of an object in each of the mounting locations S1 to S4 by using one of the laser sensors 301 to 306, and perform, as the space detection, the detection of the presence or absence of an object in each of the detected portions P1 to P8 (one example of the locations), on the side of each of the mounting locations S1 to S4, to which each of the right-side arm 100, the central arm 110, and the left-side arm 120 is to be extended.

As thus described, both the first-in item detection and the space detection is able to be performed by using one laser sensor 302 (or one laser sensor 305), thus allowing reduction in the number of sensors and the assembly time as compared to the conventional technique.

In the side arm transfer device 29 of the above-described preferred embodiment of the present invention, the right-side arm 100, the central arm 110, and the left-side arm 120 (one example of the arms) transfer loads W to the mounting locations S1, S3 on the front side of the load storage shelf 11 (one example of the shelf) and the mounting locations S2, S4 on the rear side thereof. The transfer controller 81c (one example of the controller) determines the presence or absence of an object in each of the first determination region Ln and the second determination region Lf (one example of the two regions) with different distances from the laser sensor 302, to determine the presence or absence of an object in each of the mounting locations S1, S3 on the front side and the presence or absence of an object in each of the mounting locations S2, S4 on the rear side.

As thus described, it is possible to detect the presence or absence of an object in each of the two regions Ln, Lf with different distances from the laser sensor 302 on the irradiation line of laser light, and further, by horizontally turning the laser sensor 302, it is possible to detect the presence or absence of an object in each of the two mounting locations S1, S2 in different directions from the laser sensor 302 and with different distances therefrom on the irradiation line. Further, it is possible to detect the presence or absence of an object in each of the two mounting locations S3, S4 in different directions from the laser sensor 302 and with different distances therefrom on the irradiation line.

That is, it is possible to detect the presence or absence of an object in each of the mounting locations S1, S3 on the front side and the presence or absence of an object in each of the mounting locations S2, S4 on the rear side.

In a case of detecting the presence or absence of an object in each of the two mounting locations having different distances, i.e., the mounting location S1 on the front side and the mounting location S2 on the rear side using the photoelectric sensor, for example, a photoelectric sensor needs to be provided for each of the mounting locations. However, in the side arm transfer devices according to various preferred embodiments of the present invention, an object in each of the two mounting locations is able to be detected by one laser sensor as described above, thus enabling reduction in the number of sensors as compared to the case of using the photoelectric sensors as in the conventional technique.

In the side arm transfer device 29 of the above-described preferred embodiment of the present invention, the three arms are arranged as the right-side arm 100 (one example of the first arm), the central arm 110 (one example of the second arm), and the left-side arm 120 (one example of the third arm) parallel or substantially parallel to each other at predetermined intervals on the lifting table 27 (one example of the mounting table). Loads W1, W2 are able to be transferred to the two mounting locations S1, S2 on the front side and the rear side of the load storage shelf 11 (one example of the shelf) by the central arm 110 arranged at the center and the right-side arm 100. Simultaneously with transfer of the loads to the two mounting locations S1, S2 by the central arm 110 and the right-side arm 100, loads W3, W4 are able to be simultaneously transferred to the two mounting locations S3, S4 on the front side and the rear side, which are adjacent to the two mounting locations S1, S2, by the central arm 110 and the left-side arm 120. The laser sensor 302 is arranged near the central arm 110. The transfer controller 81c (one example of the controller) determines the presence or absence of an object in each of the four mounting locations S1 to S4 on the shelf using the laser sensor 302, and determines the presence or absence of an object in each of the detected portions P5 to P8 (one example of the locations to which the second arm is to be extended).

In a case of detecting the presence or absence of an object in each of the four mounting locations S1 to S4 and detecting the presence or absence of an object in the location, on the side of each of the four mounting locations S1 to S4, to which the central arm 110 is to be extended using the photoelectric sensor, for example, one photoelectric sensor is required for each of the detection, and hence eight photoelectric sensors are required.

In contrast, the side arm transfer device 29 of the present preferred embodiment is able to perform the detection by using only one laser sensor, thus achieving reduction in the number of sensors.

Other Preferred Embodiments

Although various preferred embodiments of the present invention have been described above, the present invention is not limited to the above-described preferred embodiments, and a variety of modifications, combinations, substitutions, etc., can be made within the range and scope of the present invention. In particular, a plurality of preferred embodiments and modified examples described in the present specification can be arbitrarily combined as necessary or desired.

In the above-described preferred embodiments, the laser sensors 301, 303, 304, 305 preferably are provided near the front portion and the rear portion of the right-side arm 100 and near the front portion and the rear portion of the left-side arm 120. However, photoelectric sensors may be provided instead of the laser sensors.

Figure 15:
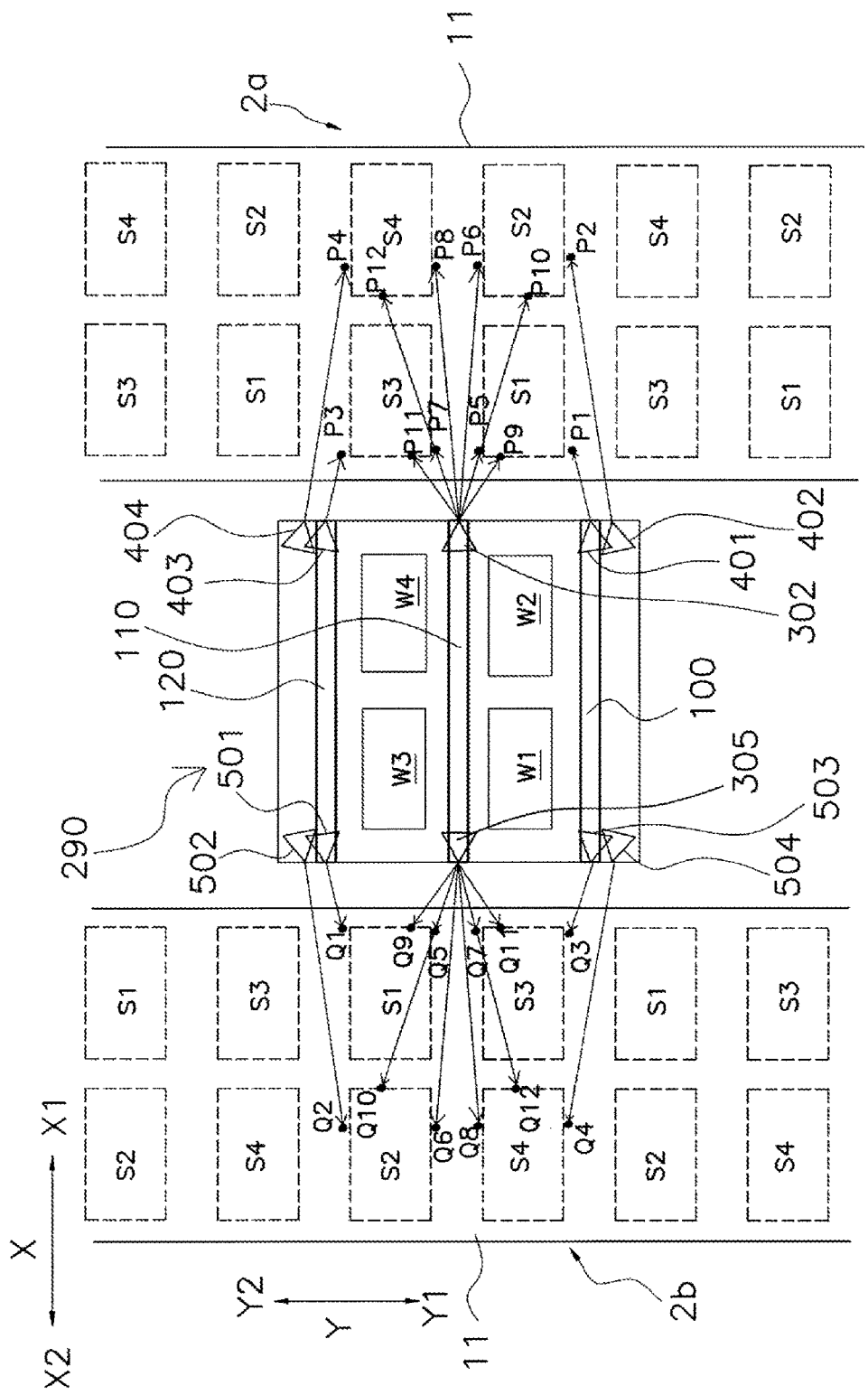
FIG. 15 is a view illustrating a side arm transfer device of an alternative preferred embodiment of the present invention.

FIG. 15 is a plan view schematically illustrating a side arm transfer device 290 preferably including photoelectric sensors. As illustrated in FIG. 15, near the front portion of the right-side arm 100, a photoelectric sensor 401 to detect the presence or absence of an object in the detected portion P1 and a photoelectric sensor 402 to detect the presence or absence of an object in the detected portion P2 are provided. Near the front portion of the left-side arm 120, a photoelectric sensor 403 to detect the presence or absence of an object in the detected portion P3 and a photoelectric sensor 404 to detect the presence or absence of an object in the detected portion P4 are provided.

Further, near the rear portion of the right-side arm 100, a photoelectric sensor 503 to detect the presence or absence of an object in the detected portion Q3 and a photoelectric sensor 504 to detect the presence or absence of an object in the detected portion Q4 are provided. Near the rear portion of the left-side arm 120, a photoelectric sensor 501 to detect the presence or absence of an object in the detected portion Q1 and a photoelectric sensor 502 to detect the presence or absence of an object in the detected portion Q2 are provided.

As for the sensors on the front side of the side arm transfer device 290, as described above, the side arm transfer device 290 is provided with the photoelectric sensor 401 (one example of the first photoelectric sensor), the photoelectric sensor 402 (one example of the second photoelectric sensor), the photoelectric sensor 403 (one example of the third photoelectric sensor) and the photoelectric sensor 404 (one example of the fourth photoelectric sensor).

The photoelectric sensor 401 is provided on the lifting table 27 (one example of the mounting table) near the right-side arm 100 (one example of the first arm), with the arm extending direction as a reference, and detects the presence or absence of an object in the detected portion P1 on the side of the mounting location S1 on the front side of the shelf (one example of the location to which the first arm is to be extended). The photoelectric sensor 402 is provided on the lifting table 27 near the right-side arm, and detects the presence or absence of an object in the detected portion P2 on the side of the mounting location S2 on the rear side of the shelf (one example of the location to which the first arm is to be extended). The photoelectric sensor 403 is provided on the lifting table 27 near the left-side arm 120 (one example of the third arm), and detects the presence or absence of an object in the detected portion P3 on the side of the mounting location S3 on the front side of the shelf (the location to which the third arm is to be extended). The photoelectric sensor 404 is provided on the lifting table 27 near the left-side arm 120, and detects the presence or absence of an object in the detected portion P4 on the side of the mounting location S4 on the rear side of the shelf (the location to which the third arm is to be extended). The transfer controller 81c determines the presence or absence of the object in each of the locations based on detection results of the photoelectric sensor 401, the photoelectric sensor 402, the photoelectric sensor 403, and the photoelectric sensor 404.

Since the right-side arm 100 and the left-side arm 120 each detect a small number of locations as compared to the central arm 110 (one example of the second arm), and loads W are arranged only on one sides thereof, a space to provide each of the sensors is ensured. Hence the photoelectric sensors may be used instead of the laser sensors.

In the above-described preferred embodiments, the region to detect an object preferably has been provided with the width as is the first determination region Ln with the distances d1 and d2 from the laser sensor 302. However, the region may not be provided with a width, and the detection may be performed at one point, only at an intermediate location between d1 and d2, for example. The same also applies to the second determination region.

Further, in the above-described preferred embodiments, the width is provided to the distance from the laser sensor 302 as the region in which the presence or absence of an object is determined, whereas a width is not provided to a turning angle of the laser sensor 302. However, a width may also be provided to the turning angle of the laser sensor 302 as the region in which the presence or absence of an object is determined.

Moreover, the side arm transfer device of the above-described preferred embodiments preferably includes the three arms, i.e., the right-side arm 100, the central arm 110, and the left-side arm 120. However, two arms may be provided instead of the central arm 110. One arm out of these two arms operates with the right-side arm 100 as a pair, and the other arm operates with the left-side arm 120 as a pair.

In this case, on the front side of the transfer device, a laser sensor to detect the detected portions P5, P6, P9, P10 illustrated in FIG. 7 is provided at the front end of the right-side arm of the two central arms, and a laser sensor to detect the detected portions P7, P8, P11, P12 is provided at the front end of the left-side arm. Further, on the rear side of the transfer device, a laser sensor to detect the detected portions Q5, Q6, Q9, Q10 illustrated in FIG. 7 is provided at the rear end of the left side arm of the two central arms, and a laser sensor to detect the detected portions Q7, Q8, Q11, Q12 is provided at the rear end of the right-side arm.

Figure 16:
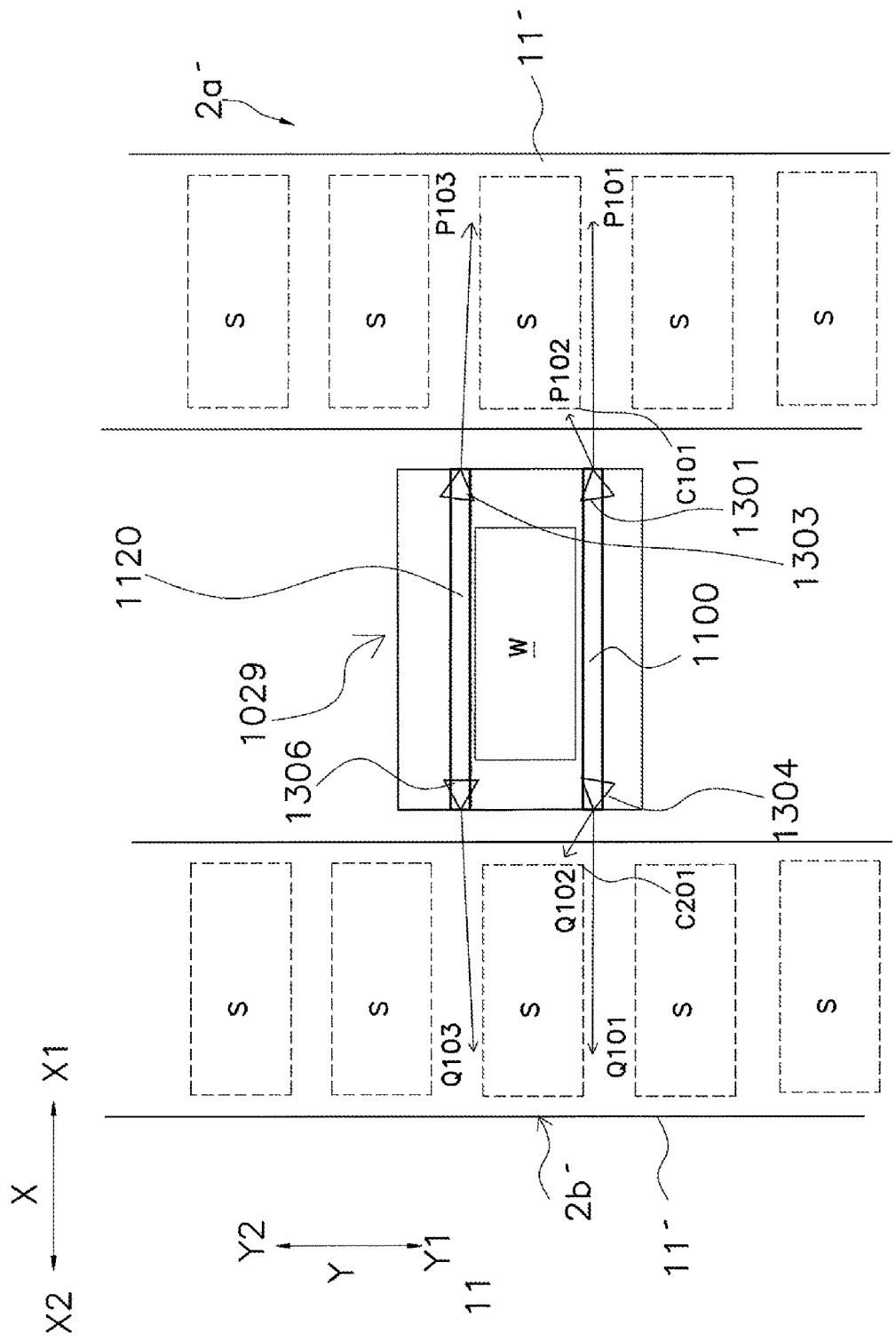
FIG. 16 is a view illustrating a side arm transfer device of an alternative preferred embodiment of the present invention.

In the side arm transfer device of the above-described preferred embodiments, loads are able to be transferred to two locations on the front side and the rear side of the load storage shelf 11. However, a side arm transfer device may transfer a load to only one location. FIG. 16 is a schematic plan view of a side arm transfer device 1029 for transferring one load. In the side arm transfer device 1029 illustrated in FIG. 16, a right-side arm 1100 and a left-side arm 1120 are extendably arranged on the lifting table 27, and only one load W can be mounted on the lifting table 27. A laser sensor 1301 is provided near the front end portion of the right-side arm 1100, and a laser sensor 1304 is provided near the rear end portion of the right-side arm 1100. Further, a laser sensor 1303 is provided near the front end portion of the left-side arm 1120, and a laser sensor 1306 is provided near the rear end portion of the left-side arm 1120.

At the time of mounting a load W on a load storage shelf 11' of a front rack 2a', when the load is to be mounted with a corner C101 at the right rear end as a reference, the laser sensor 1301 detects the presence or absence of an object in a detected portion P101 on the right side of a mounting location S, to detect a space for the right-side arm 1100 to enter, and the laser sensor 1301 detects the presence or absence of an object in a detected portion P102 on the rear side of the mounting location S, to detect the presence or absence of an object in the mounting location S. Further, the laser sensor 1303 detects the presence or absence of an object in a detected portion P103 on the left side of the mounting location S, to detect a space for the left-side arm 1120 to enter.

Note that, in the above configuration, turning mechanisms preferably are provided only in the laser sensors 1303, 1304.

At the time of mounting a load W on the load storage shelf 11' of a rear rack 2b', when the load is to be mounted with a corner C201 at the right front end as a reference, the laser sensor 1304 detects the presence or absence of an object in a detected portion Q101 on the right side of a mounting location S, to detect a space for the right-side arm 1100 to enter, and the laser sensor 1304 detects the presence or absence of an object in a detected portion Q102 on the front side of the mounting location S, to detect the presence or absence of an object in the mounting location S. Further, the laser sensor 1306 detects the presence or absence of an object in a detected portion Q103 on the left side of the mounting location S, to detect a space for the left-side arm 1120 to enter.

In the above-described preferred embodiments, the first-in item detection is performed before receiving loads, but the space detection and detection as to whether or not loads W1 to W4 are mounted may be performed before delivery of the loads. In this case, when the loads W1, W3 on the front side are present, laser light is blocked by the loads W1, W3, thus preventing detection of the loads W2, W4 on the rear side. However, at the time of storing loads on a load storage shelf, the loads are generally mounted from the rear side. Thus, when a load is present on the front side, it can be determined that a load is present on the rear side thereof.

Further, in the side arm transfer device of the above-described preferred embodiments, the transfer controller 81c has received information concerning a distance from the laser sensor 302 to determine whether or not an object is present in the first determination region Ln or the second determination region Lf. However, the transfer controller 81c may receive information concerning time from the laser sensor 302 and determine whether or not an object is present in the first determination region Ln or the second determination region Lf based on the time.

For example, time required for laser light to reciprocate over the distance d1 illustrated in FIG. 11 is referred to as t1, time required for laser light to reciprocate over the distance d2 is referred to as t2, time required for laser light to reciprocate over the distance d3 is referred to as t3, and time required for laser light to reciprocate over the distance d4 is referred to as t4. Time from projection of laser light from the light projector 302a to reception of the laser light in the light receiver 302b is referred to as tx.

The transfer controller 81c receives, from the laser sensor 302, information concerning time (e.g., tx) from projection of laser light from the light projector 302a to reception of the laser light in the light receiver 302b.

In a case where the transfer controller 81c sets a range between t1 and t2 as first determination time, when tx is within the range between t1 and t2, the transfer controller 81c determines that an object is present in the first determination region Ln. On the other hand, when tx is out of the range between t1 and t2, the transfer controller 81c determines that an object is not present in the first determination region Ln.

Further, in a case where the transfer controller 81c sets a range between t3 and t4 as second determination time, when tx is within the range between t3 and t4, the transfer controller 81c determines that an object is present in the second determination region Lf. On the other hand, when tx is out of the range between t3 and t4, the transfer controller 81c determines that an object is not present in the second determination region Lf.

Note that, the time tx has been cited as the information concerning time, but it may be a phase difference of laser light, or may be any other information from which the transfer controller 81c can derive time.

In the side arm transfer device of the above-described preferred embodiments, a load W has been transferred preferably by the hooks, but a cramp system to hold a load between arms may be used.

In the above-described preferred embodiments, the side arm transfer device preferably has been provided in the stacker crane to be also vertically movable, but the present invention is not limited thereto. For example, the side arm transfer device may be provided at each stage of the front rack 2a and the rear rack 2b. In this case, the side arm transfer device includes a shuttle carriage as an example of the mounting table, and arms are arranged in the shuttle carriage. With the provision of the shuttle carriage, the side arm transfer device is movable in the left-right direction. When the side arm transfer device is arranged at each stage as thus described, the lifting table is not provided as in the stacker crane, and the shuttle carriage is provided as an example of the mounting table.

According to various preferred embodiments of the present invention, side arm transfer devices which are more easily assembled is applicable to a stacker crane in an automated warehouse or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A side arm transfer device which extends and retracts an arm to and from a side of a load to be transferred, the side arm transfer device comprising:
    a mounting table that extendably supports the arm, and is mounted with the load;
    a laser sensor that is provided on the mounting table and detects presence or absence of an object on an irradiation line of laser light;
    a turning mechanism that horizontally turns the laser sensor; and
    a controller; wherein
    the arm is adapted to transfer a load to a first mounting location, a second mounting location, a third mounting location, and a fourth mounting location;
    the first mounting location and the third mounting location are on a front side of the shelf, the second mounting location and the fourth mounting location are on a rear side of the shelf, and the first mounting location and the third mounting location are adjacent to the second mounting location and the fourth mounting location; and
    the controller is programmed to horizontally turn the laser sensor and determine presence or absence of an object in each of the first mounting location, the second mounting location, the third mounting location, and the fourth mounting location on the shelf by using the laser sensor.

2. The side arm transfer device according to claim 1, wherein the controller is programmed to determine the presence or absence of an object in each of two regions with different distances from the laser sensor in order to determine the presence or absence of an object in the first mounting location and the third mounting location on the front side of the shelf and the presence or absence of an object in the second mounting location and the fourth mounting location on the rear side of the shelf.

3. The side arm transfer device according to claim 2, wherein
 the arm includes a first arm, a second arm, and a third arm parallel or substantially parallel to each other at predetermined intervals on the mounting table;
 a load is able to be transferred to each of the first mounting location and the second mounting location by the second arm arranged at a center and the first arm;
 a load is able to be transferred to each of the third mounting location and the fourth mounting location by the second arm and the third arm, simultaneously with the transfer of the load to each of the first mounting location and the second mounting location by the second arm and the first arm;
 the laser sensor is arranged near the second arm; and
 the controller is programmed to determine the presence or absence of an object in a location to which the second arm is to be extended.

4. The side arm transfer device according to claim 3, further comprising:
 a first photoelectric sensor that is provided on the mounting table near the first arm, and detects the presence or absence of an object in a location, on a side of the mounting location on the front side of the shelf, to which the first arm is to be extended;
 a second photoelectric sensor that is provided on the mounting table near the first arm, and detects the presence or absence of an object in a location, on a side of the mounting location on the rear side of the shelf, to which the first arm is to be extended;
 a third photoelectric sensor that is provided on the mounting table near the third arm, and detects the presence or absence of an object in a location, on a side of the mounting location on the front side of the shelf, to which the third arm is to be extended; and
 a fourth photoelectric sensor that is provided on the mounting table near the third arm, and detects the presence or absence of an object in a location, on a side of the mounting location on the rear side of the shelf, to which the third arm is to be extended, wherein
 the controller is programmed to determine presence or absence of the object in each of the regions based on detection results of the first photoelectric sensor, the second photoelectric sensor, the third photoelectric sensor, and the fourth photoelectric sensor.

5. The side arm transfer device according to claim 1, wherein the controller is programmed to determine presence or absence of an object in a location, to which the arm is to be extended, on a side of the first mounting location, the second mounting location, the third mounting location, or the fourth mounting location.

6. The side arm transfer device according to claim 1, wherein the arm is adapted to simultaneously transfer a load to each of the first mounting location, the second mounting location, the third mounting location, and the fourth mounting location.

\* \* \* \* \*